(12) United States Patent
Azernikov et al.

(10) Patent No.: US 11,291,532 B2
(45) Date of Patent: Apr. 5, 2022

(54) DENTAL CAD AUTOMATION USING DEEP LEARNING

(71) Applicant: James R. Glidewell Dental Ceramics, Inc., Newport Beach, CA (US)

(72) Inventors: Sergei Azernikov, Irvine, CA (US); Sergey Nikolskiy, Coto de Caza, CA (US)

(73) Assignee: James R. Glidewell Dental Ceramics, Inc., Newport Beach, CA (US)

( * ) Notice: Subject to any disclaimer, the term of this patent is extended or adjusted under 35 U.S.C. 154(b) by 915 days.

(21) Appl. No.: 15/660,073

(22) Filed: Jul. 26, 2017

(65) Prior Publication Data

US 2018/0028294 A1 Feb. 1, 2018

Related U.S. Application Data

(60) Provisional application No. 62/367,242, filed on Jul. 27, 2016, provisional application No. 62/504,213, filed on May 10, 2017.

(51) Int. Cl.
*A61C 13/00* (2006.01)
*G06T 7/00* (2017.01)
(Continued)

(52) U.S. Cl.
CPC ........ *A61C 13/0004* (2013.01); *G06K 9/6274* (2013.01); *G06N 3/08* (2013.01);
(Continued)

(58) Field of Classification Search
CPC ................ A61C 13/0004; A61C 7/002; A61C 2007/004; G06T 2207/20084; G06N 3/08; G06N 5/04
See application file for complete search history.

(56) References Cited

U.S. PATENT DOCUMENTS 6,409,504 B1 6/2002 Jones et al.
7,084,868 B2 8/2006 Farag et al.
(Continued)

FOREIGN PATENT DOCUMENTS

DE 102017203475 A1 9/2018
WO 2018158411 A1 9/2018

OTHER PUBLICATIONS

PCT Application No. PCT/US2017/043943, International Preliminary Report, dated Jan. 29, 2019, in 8 pages.
(Continued)

*Primary Examiner* — Michael J Huntley
*Assistant Examiner* — Oluwatosin O Alabi
(74) *Attorney, Agent, or Firm* — Charles Fowler

(57) ABSTRACT

A computer-implemented method of recognizing dental information associated with a dental model of dentition includes training a deep neural network to map a plurality of training dental models representing at least a portion of each one of a plurality of patients' dentitions to a probability vector including probability of the at least a portion of the dentition belonging to each one of a set of multiple categories. The category of the at least a portion of the dentition represented by the training dental model corresponds to the highest probability in the probability vector. The method includes receiving a dental model representing at least a portion of a patient's dentition and recognizing dental information associated with the dental model by applying the trained deep neural network to determine a category of the at least a portion of the patient's dentition represented by the received dental model.

18 Claims, 20 Drawing Sheets

(51) Int. Cl.
    *G06K 9/62*               (2022.01)
    *G06K 9/00*               (2022.01)
    *G06N 3/08*               (2006.01)
    *G06N 5/04*               (2006.01)
    *A61C 7/00*               (2006.01)
    *G06V 20/64*             (2022.01)

(52) U.S. Cl.
    CPC ............ *G06N 5/04* (2013.01); *G06T 7/0012* (2013.01); *G06V 20/653* (2022.01); *A61C 7/002* (2013.01); *A61C 2007/004* (2013.01); *G06T 2207/20076* (2013.01); *G06T 2207/20081* (2013.01); *G06T 2207/30036* (2013.01)

(56) References Cited

U.S. PATENT DOCUMENTS

| | | | |
|---|---|---|---|
| 7,702,492 B2 | 4/2010 | Marshall | |
| 7,708,557 B2 | 5/2010 | Rubbert | |
| 8,126,726 B2* | 2/2012 | Matov | G06Q 50/22 705/2 |
| 8,454,362 B2 | 6/2013 | Rubbert | |
| 8,602,780 B2 | 12/2013 | Rubbert | |
| 9,417,700 B2 | 8/2016 | El Dokor et al. | |
| 9,474,582 B2* | 10/2016 | Musuvathy | A61F 2/30942 |
| 10,537,463 B2 | 1/2020 | Kopelman | |
| 10,542,944 B2 | 1/2020 | Petersilka | |
| 10,912,530 B2 | 2/2021 | Mandelkem et al. | |
| 11,154,267 B2 | 10/2021 | Mandelkem et al. | |
| 2005/0192835 A1 | 9/2005 | Kou et al. | |
| 2007/0183633 A1 | 8/2007 | Hoffmann | |
| 2013/0244208 A1 | 9/2013 | Rubbert | |
| 2014/0003695 A1 | 1/2014 | Dean et al. | |
| 2017/0045950 A1 | 2/2017 | El Dokor et al. | |
| 2017/0340418 A1* | 11/2017 | Raanan | A61B 8/0875 |
| 2018/0008213 A1 | 1/2018 | Rubbert | |
| 2018/0303581 A1 | 10/2018 | Martz | |
| 2020/0000562 A1 | 1/2020 | Wey | |

OTHER PUBLICATIONS

Stefan Raih, et al., Artificial Neural Networks as a powerful numerical tool to classify specific features of a tooth based on 3D scan data. Elsevier, Computers in Biology and Medicine 80 (2017), pp. 65-76.

PCT Application No. PCT/US2017/043943, International Search Report, dated Oct. 12, 2017, in 11 pages.

* cited by examiner

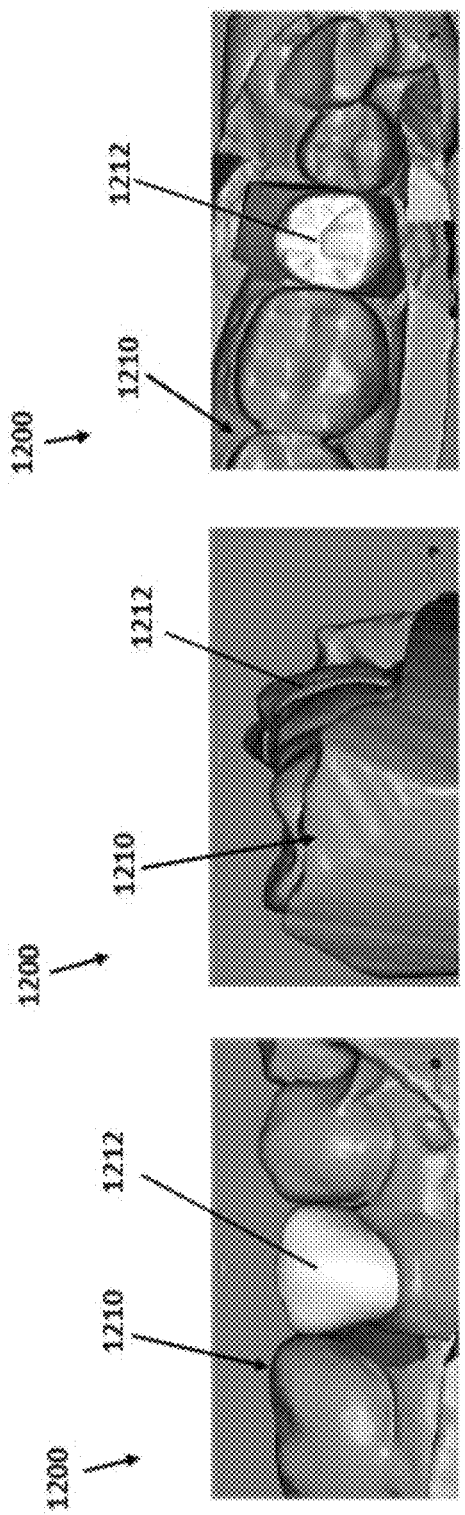

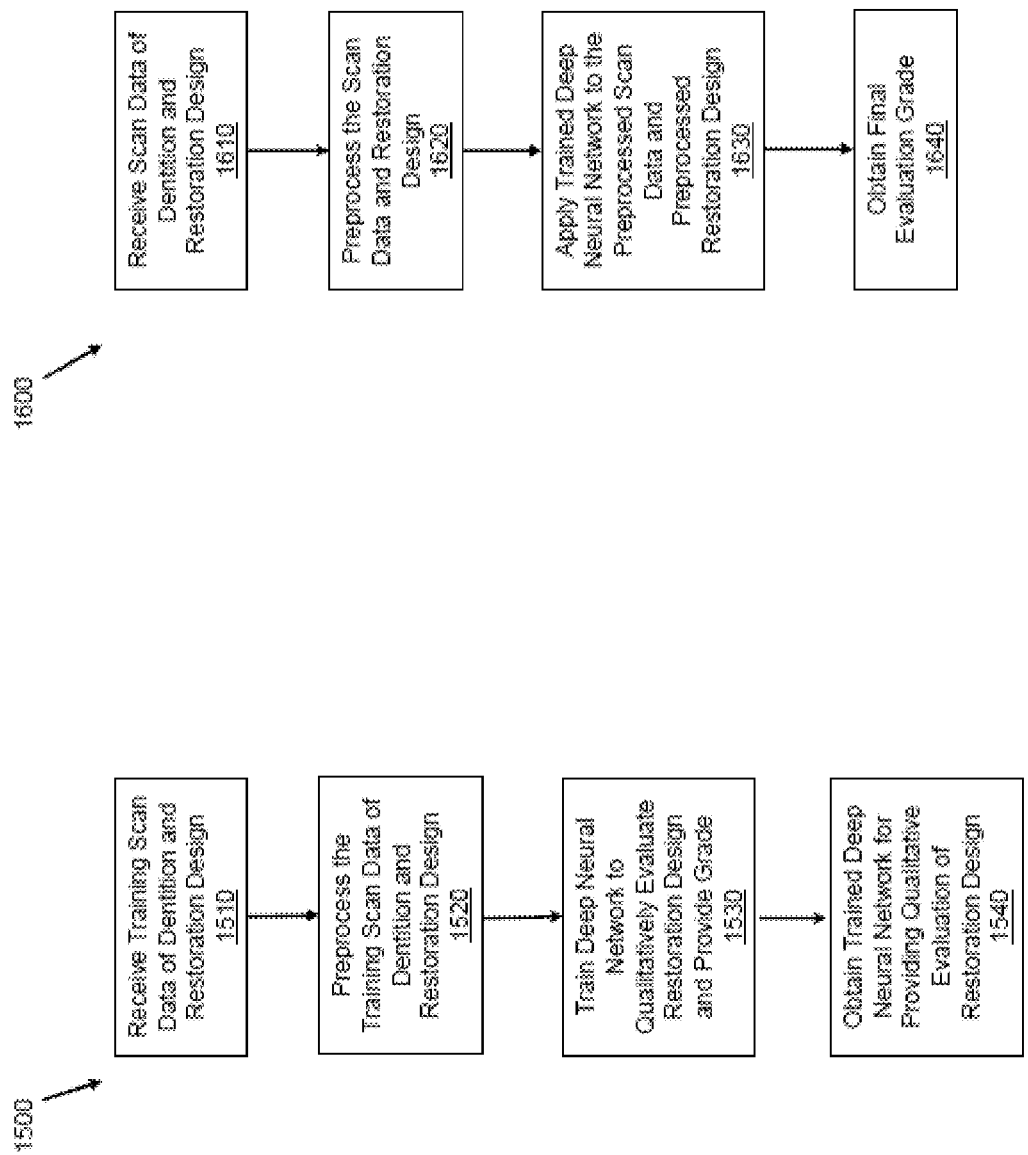

DENTAL CAD AUTOMATION USING DEEP LEARNING

CROSS-REFERENCE TO RELATED APPLICATION

This non-provisional application claims priority to Provisional Application No. 62/367,242 filed on Jul. 27, 2016, and to Provisional Application No. 62/504,213 filed on May 10, 2017, both of which are incorporated herein by reference in their entirety.

TECHNICAL FIELD

The disclosure relates generally to the field of dental computer-aided design (CAD), and specifically to dental CAD automation using deep learning.

BACKGROUND

Recently, CAD/CAM dentistry (Computer-Aided Design and Computer-Aided Manufacturing in dentistry) has provided a broad range of dental restorations, including crowns, veneers, inlays and onlays, fixed bridges, dental implant restorations, and orthodontic appliances. In a typical CAD/CAM based dental procedure, a treating dentist can prepare the tooth being restored either as a crown, inlay, onlay or veneer. The prepared tooth and its surroundings are then scanned by a three dimensional (3D) imaging camera and uploaded to a computer for design. Alternatively, a dentist can obtain an impression of the tooth to be restored and the impression may be scanned directly, or formed into a model to be scanned, and uploaded to a computer for design.

Current dental CAD still relies heavily on manual labor. Minimizing the amount of manual labor involved in the CAD of those restorations is of high interest. The ultimate goal is to provide a fully-automatic solution capable of delivering acceptable designs without any human interference. In order to build such a highly autonomous dental CAD system, a high level of expertise needs to be integrated into the software. One way to do this is to develop a comprehensive set of rules that would include all the nuances known to the experienced dental professionals and formulating it in a way machines can understand. However, each dental restoration is unique and certain decisions that are made by dental technicians are very hard to define rigorously. Therefore, this is a very tedious task, and obviously feasible only when this set of rules can be provided.

A different approach which recently gained popularity in the machine learning (ML) community is based on an idea to build a system which is capable of learning from a large number of examples without explicit formulation of the rules. This method is commonly referred to as deep learning (DL), which is used with certain amount of success in speech recognition (e.g., Siri), computer vision (e.g., Google+), automatic offering (e.g., Amazon) to name a few. With the availability of large amounts of data and increased computational power, problems that seemed intractable just a couple years ago are now addressable. DL allows very large deep neural networks (DNNs) to be trained using massive amounts of data.

SUMMARY

Disclosed is a computer-implemented method for recognizing dental information. The method includes training, using a plurality of dentition training data sets, a deep neural network to map one or more dental features in at least one portion of each dentition training data set from the plurality of dentition training data sets to one or more highest probability values of a probability vector. Each training data set can be a set of real dentition data derived from scanning a 3D model of a patient's dentition or from a direct intraoral scan of the patient's teeth.

Embodiments of the method further include: receiving a patient's scan data representing at least one portion of the patient's dentition data set; and identifying, using the trained deep neural network, one or more dental features in the patient's scan data based on one or more output probability values of the deep neural network. The deep neural network is also trained to map locations of the one or more dental features in the at least one portion of each dentition training data set to a highest location probability value of a location probability vector. Embodiments of the method further include determining locations of the identified one or more dental features in the patient's scan data based on output probability values. The location of an identified dental feature can be the location of a prepared tooth that is ready to receive a crown. Embodiments of the method further include generating a contour of a crown for the prepared tooth based on the identified one or more dental features and the locations of the identified one or more dental features in the patient's scan data.

Also disclosed is a computer program product comprising a computer-readable storage medium having computer program logic recorded thereon for enabling a processor-based system to recognize dental information and to design a dental restoration from the recognized dental information. The computer program product includes: a first program logic module for enabling the processor-based system to train a deep neural network to map one or more dental features in at least one portion of each dentition training data set from the plurality of dentition training data sets to one or more highest probability values of a probability vector; a second program logic module for enabling the processor-based system to receive a patient's scan data representing at least one portion of the patient's dentition data set; and a third program logic module for enabling the processor-based system to identify one or more dental features in the patient's scan data based on one or more output probability values of the deep neural network.

Also disclosed is a system for fabricating a dental restoration from a patient's dentition data. The system includes a dental restoration client, a 3D modeling module, and a 3D module fabricator. The dental restoration client is configured to receive, from a user interface, an input indicating a selection of a dental restoration type to be fabricated. An example of a dental restoration type is a crown.

The 3D modeling module can be on the same machine as the dental restoration client. Alternatively, the 3D modeling module can be on a local network or can be remotely located on a remote server. The 3D modeling module is configured to receive a dentition data set of a patient, which can be generated by scanning a 3D impression or model of the patient's teeth. The 3D modeling module is also configured to select a deep neural network pre-trained by a group of dentition training data sets designed for a restoration model that matches the selected dental restoration type. For example, if the selected dental restoration type is a crown, then a deep neural network that is pretrained by a group of dentition training data sets specifically designed for mapping crowns is selected. The 3D modeling can then use the patient's dentition data set as an input to the selected pre-trained deep neural network. The 3D modeling can then generate an output restoration model using the selected pre-trained deep neural network based on the patient's dentition data.

Finally, the 3D fabricator is configured to fabricate a 3D model of the selected dental restoration type using the output restoration model generated by the 3D modeling module. The 3D fabricator can be a milling machine or a 3D printer. One or more of the system components/modules (e.g., the dental restoration client, the 3D modeling module, and the 3D module fabricator) can reside on the same local network or can be remotely located from each other.

Also disclosed is a computer-implemented method for recognizing dental information associated with a digital dental model of dentition. Embodiments of the method include training, by one or more computing devices, implemented by one or more processors of a system to map a plurality of training scan models representing at least a portion of each one of a plurality of patients' dentitions to a probability vector. The probability vector includes probability of the at least a portion of the dentition belonging to each one of a set of multiple categories. The deep neural network is trained so that the category of the at least a portion of the dentition represented by the training dental models corresponds to the highest probability in the probability vector. Embodiments of the method also include receiving a dental model representing at least a portion of a patient's dentition. Embodiments of the method further include recognizing dental information associated with the dental model of the at least a portion of the patient's dentition by applying the trained deep neural network to determine a category of the at least a portion of the patient's dentition represented by the received dental model.

The category of dentition or dental feature can include a lower jaw, an upper jaw, a prepared jaw, an opposing jaw, a set of tooth numbers, and dental restoration types. The restoration types can include crowns, inlays, bridges, and implants.

Embodiments of the method further include preprocessing, by one or more computing devices, the training data set(or training data set) representing at least a portion of each one of a plurality of patients' dentitions by generating depth maps from the training three dimensional (3D) scan data. The depth map can be generated by converting 3D coordinates of each point of the 3D scan data into a distance value from a given plane to each of the point. The depth map can also be generated as a bitmap image and for each pixel of the image the depth is encoded.

Embodiments of the method further include segmenting, by one or more computing devices, each of the training dental models into different portions of each patient's dentition that represents different categories.

Embodiments of the method further include segmenting, by one or more computing devices, the dental model into different portions of the patient's dentition that represents different categories prior to recognizing the dental information associated with the dental model.

Also disclosed is a computer-implemented method for recognizing dental information from scan data of dentition. The method includes training, by one or more computing devices, a deep neural network implemented by one or more processors of a system to map training data set representing at least a portion of each one of a plurality of patients' dentitions to a probability vector. The probability vector can include a probability of each dental feature being present in the at least a portion of the dentition. The disclosed method can train deep neural network to detect a certain dental feature being present in the at least a portion of the dentition based on the highest probability in the probability vector.

Embodiments of the method also include: training, by one or more computing devices, the deep neural network implemented by one or more processors of a system to determine a location of the certain dental feature being present in the at least a portion of the dentition; and receiving, by one or more computing devices, scan data representing at least a portion of a patient's dentition.

Embodiments of the method further include detecting whether a dental feature is present in the at least a portion of the patient's dentition data set using the trained deep neural network.

A dental feature can be an aspect or a feature of tooth surface anatomy that includes, but not limited to, buccal and lingual cusps, distobucall and mesiobuccal inclines, distal and mesial cusp ridges, distolingual and mesiolingual inclines, an occlusal surface, and buccal and lingual arcs. A dental feature can include one of a set of teeth with corresponding tooth numbers. A dental feature can include a dental preparation, and one of a lower jaw and an upper jaw. Further, a dental feature can include one of a prepared jaw and an opposing jaw. Still further, a dental feature can include one of a set of dental restorations with different types. Still further, a dental feature can include a margin line.

Also disclosed are computer-implemented methods for recognizing dental information from scan data of a dentition. The method includes: training, by one or more computing devices, a deep neural network implemented by one or more processors of a system to detect a location of a dental feature present in the at least a portion of the dentition; receiving, by one or more computing devices, scan data representing at least a portion of a patient's dentition; and detecting, by one or more computing devices, whether the at least a portion of the dentition the dental feature is present by applying the trained deep neural network.

Also disclosed are computer-implemented methods for performing qualitative evaluations of restoration designs. Embodiments of the method include training a deep neural network to detect identified types of restoration design defects. The deep neural network is trained so that, once a defect is found, the system will provide feedback to a restoration design module that an identified design aspect requires improvement.

Embodiments of the method include deep neural networks that are trained to perform qualitative evaluations of restoration contour, restoration margin line fit, restoration fit relative to contact areas of adjacent teeth, and restoration fit relative to occlusal contacts with teeth of the opposing jaw. Embodiments of the method further include performing qualitative evaluations of restoration designs and using the output of the evaluation to assign a final evaluation grade that is used by the system to determine a further processing option for the restoration design.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF THE DRAWINGS

The details of the subject matter set forth herein, both as to its structure and operation, may be apparent by study of the accompanying figures, in which like reference numerals refer to like parts. The components in the figures are not necessarily to scale, emphasis instead being placed upon illustrating the principles of the subject matter. Moreover, all illustrations are intended to convey concepts, where relative sizes, shapes and other detailed attributes may be illustrated schematically rather than literally or precisely.

FIGS. 12A-C are buccal, distal-to-mesial, and occlusal views of a two dimensional (2D) representation of a three dimensional (3D) dental model of a portion of a patient's dentition and showing a restoration design attached to a prepared tooth.

FIG. 15 is a flow chart of a method for training a deep neural network according to one embodiment.

FIG. 16 is a flow chart of a method for performing a qualitative evaluation of a restoration design associated with a dental model using a trained deep neural network according to one embodiment.

DETAILED DESCRIPTION

Figure 1:
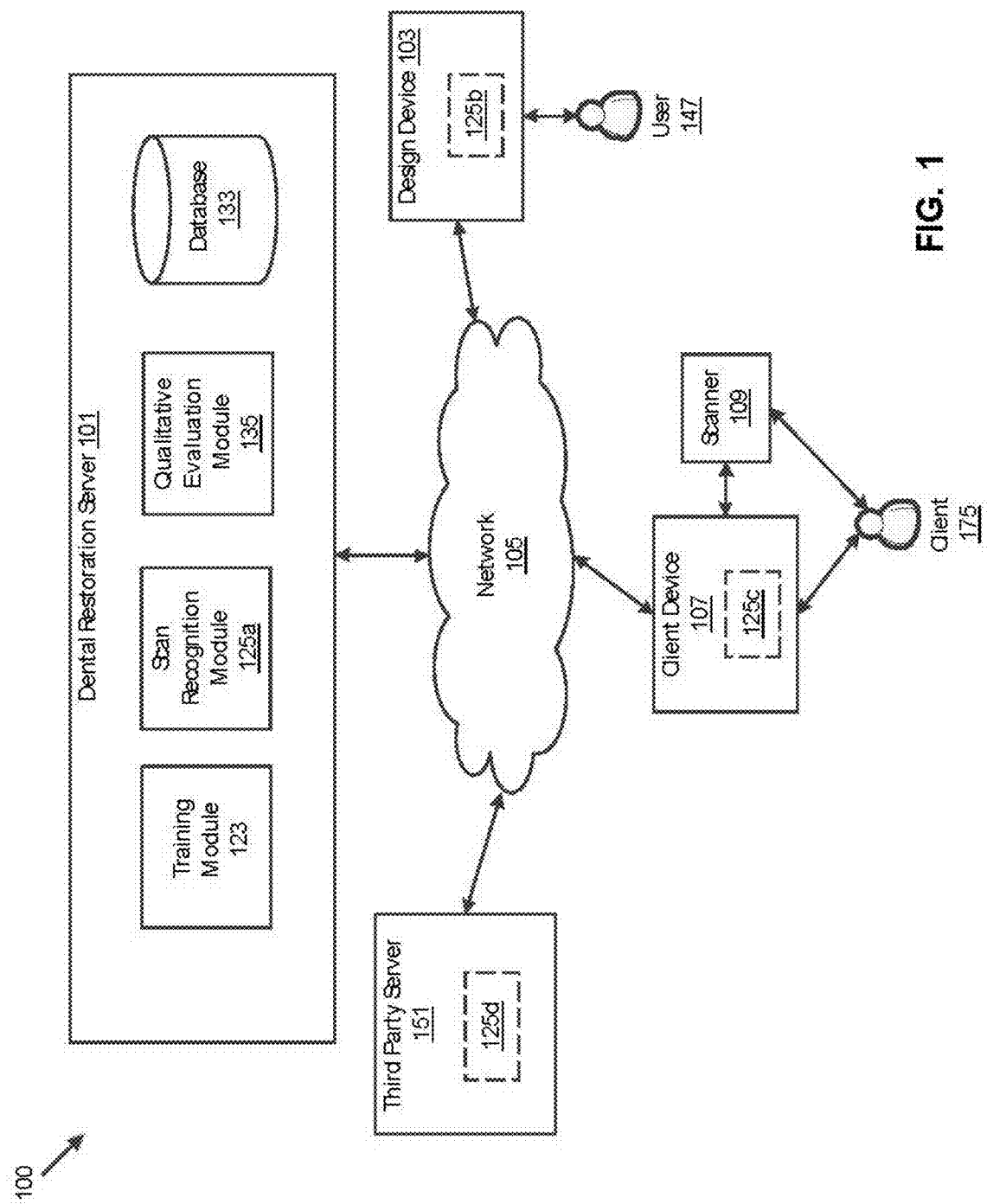
FIG. 1 is a high-level block diagram of a system for recognizing dental information from scan data of patients' dentitions according to one embodiment.

Systems and methods for recognizing dental information or features from scan data of patients' dentitions using deep neural networks are described below. In the following description, for purposes of explanation, numerous specific details are set forth to provide a thorough understanding of the invention. However, it will be apparent to one skilled in the art that the invention can be practiced without these specific details. In other instances, structures and devices are shown in a block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the following detailed description are presented in terms of algorithms and symbolic representations of operations on data bits within a computer memory. These algorithmic descriptions and representations are the methods used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared or otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following disclosure, it is appreciated that throughout the disclosure terms such as "processing," "computing," "calculating," "determining," "displaying" or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display devices.

The present invention also relates to an apparatus for performing the operations herein. This apparatus may be specially constructed for the required purposes, or it may be a general-purpose computer selectively activated or reconfigured by a computer program stored in a computer-usable or computer-readable storage medium. The invention may take the form of an entirely hardware embodiment, an entirely software embodiment or an embodiment including both hardware and software elements. In one embodiment, the invention is implemented in software comprising instructions or data stored on a computer-usable or computer-readable storage medium, which includes but is not limited to firmware, resident software, microcode or another method for storing instructions for execution by a processor.

Furthermore, the invention may take the form of a computer program product accessible from a computer-usable or computer-readable storage medium providing program code for use by, or in connection with, a computer or any instruction execution system. For the purposes of this description, a computer-usable or computer readable storage medium is any apparatus that can contain, store or transport the program for use by or in connection with the instruction execution system, apparatus or device. The computer-readable storage medium can be an electronic, magnetic, optical, electromagnetic, infrared, or semiconductor system (or apparatus or device) or a propagation medium. Examples of a tangible computer-readable storage medium include, but are not limited to, a semiconductor or solid state memory, magnetic tape, a removable computer diskette, a random access memory (RAM), a read-only memory (ROM), a rigid magnetic disk, an optical disk, an EPROM, an EEPROM, a magnetic card or an optical card, or any type of computer-readable storage medium suitable for storing electronic instructions, and each coupled to a computer system bus. Examples of optical disks include compact disk—read only memory (CD-ROM), compact disk—read/write (CD-R/W) and digital video disc (DVD).

A data processing system suitable for storing and/or executing program code includes at least one processor coupled directly or indirectly to memory elements through a system bus. The memory elements may include local memory employed during actual execution of the program code, bulk storage and cache memories providing temporary storage of at least some program code in order to reduce the number of times code must be retrieved from bulk storage during execution. In some embodiments, input/output (I/O) devices (such as keyboards, displays, pointing devices or other devices configured to receive data or to present data) are coupled to the system either directly or through intervening I/O controllers.

Network adapters may also be coupled to the data processing system to allow coupling to other data processing systems or remote printers or storage devices through intervening private or public networks. Modems, cable modem and Ethernet cards are just examples of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. It will be appreciated that a variety of programming languages may be used to implement the teachings of the invention as described herein.

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

System Overview

Exemplary embodiments of methods and systems for recognizing dental information or features and for generating dental restoration models from scan data of patients' dentitions using deep neural networks are described herein. A patient's dentition data set can include one or more of the patient's scan data from multiple and/or duplicative scans of various portions of the patient's mouth. For example, each scan data can be a scan of one or more portions of the patient's jaw. The computer-implemented methods of designing dental restorations described herein use an electronic image of at least a portion of a patient's oral situation as a starting point for the design process. In some embodiments, the electronic image is obtained by a direct intraoral scan of the patient's teeth. This typically takes place, for example, in a dental office or clinic and is performed by a dentist or dental technician. In other embodiments, the electronic image is obtained indirectly by scanning an impression of the patient's teeth, by scanning a physical model of the patient's teeth, or by other methods known to those skilled in the art. This typically takes place, for example, in a dental laboratory and is performed by a laboratory technician. Accordingly, the methods described herein are suitable and applicable for use in chair side, dental laboratory, or other environments. Using the electronic image, a computer-implemented dental information or features recognition system is used to automatically identify useful dental structure and restoration information and detect features and margin lines of dentition, thus facilitating automatic dental restoration design and fabrication in the following steps.

In one embodiment, a plurality of scans (e.g., 3-5 scans per quadrant) is performed in order to obtain a suitable image of the patient's dental or oral anatomy. For example, an occlusal, lingual, and buccal scan may be taken of both the preparation and the opposing jaws. Then, a single scan with the jaws in occlusion may be taken from the buccal perspective to establish the proper occlusion relationship between the preparation jaw and the opposing jaw. Additionally, in some embodiments, interproximal scans are added to capture the contact areas of neighboring teeth. Once the scanning process is completed, a scanning system (not shown) will assemble the plurality of scans into a digital model (also referred to as a "dental model" or "digital dental model" herein) of the preparation tooth and its surrounding and opposing teeth. The dental model can be used to design a dental restoration (e.g., crown, bridge, implant) to be used on the preparation tooth or site (on the gum). For example, a dental restoration design program may process and display the dental model in a user interface on a user device. A user (e.g., a design technician) operating on the user device can view the dental model and design or refine a restoration model based on the dental model.

In one embodiment, the present systems and methods may train deep neural networks, using many dentition training data sets, to automatically recognize dental information and/or features from the dental model representing at least a portion of a patient's dentition. The systems and methods may display the recognized dental information and/or features before the user starts doing manual design. For example, the present system may identify and label upper and lower jaws, prepared and opposing jaws, the number of a tooth on which the preparation is to be used, or the type of restoration to be designed. In other examples, the present systems and methods may also train deep neural networks to detect various dental features (e.g., cusps, and margin line) of the dentition for the user. Therefore, the user does not have to start the design process from scratch. Instead, the user is presented with recognized dental information and features that the user can use to design a dental restoration easier and faster. Further, in some situations, the automatically recognized dental information and features may function as a check to guarantee the user performs the design appropriately.

In one embodiment, the present system may feed the recognized dental information and features to other auto-design programs for generating a restoration auto-proposal for users. For example, the auto-design programs can search a tooth library for the library tooth arch form that best matches the dentition in the dental model and position it naturally. By combining the recognized dental information and features into the proposed library tooth arch form, the present system further facilitates the users' design.

In one embodiment, the present systems and methods may employ a generative adversarial network (GAN) to generate a 3D model of a dental restoration such as a crown, a bridge, or an implant. For example, the generator of the GAN can be trained to output a 3D model of a crown using random (noise) dentition scan data sets as inputs. Although purely random dentition scan data sets can be used to train the generator, a faster convergence time may be achieved by using scan data sets specific to the type of dental features and/or restorations of interest. For example, the training data sets can be certain types of dentition data such as crown data, implant data, margin line data, cusp data, tooth surface anatomy data, dental restorations data, etc. The discriminator of the GAN may be trained, using real dental restoration (e.g., crown) models, to recognize whether the output 3D model from the generator is a real or fake model. If the output 3D model is determined to be a fake by the discriminator, the generator creates another model that can fool the discriminator to think that the output model is the same as the input (real/ideal) model.

FIG. 1 shows a block diagram of a system 100 for recognizing dental information from scan data of patients' dentitions according to one embodiment. System 100 includes a dental restoration server 101, a design device 103 operated by a user 147, and a client device 107 and a scanner 109 operated by a client 175. System 100 can be coupled to a third party server 151 connected by a network 105. Only one dental restoration server 101, one design device 103, one client device 107 and one third party server 151 are shown in FIG. 1 in order to simplify the description. Embodiments of system 100 can have multiple dental restoration servers 101, design devices 103, client devices 107 and third party servers 151 connected to the network 105. Likewise, the functions performed by the various entities of FIG. 1 may differ in different embodiments.

Network 105 enables communications among the dental restoration server 101, design device 103, client device 107 and third party server 151. In one embodiment, network 105 uses standard communications technologies and/or protocols. For example, network 105 may be a conventional type of network, wired or wireless, and may have any number of configurations such as a star configuration, token ring configuration or other configurations known to one skilled in the related art. In another embodiment, the entities can use custom and/or dedicated data communications technologies instead of, or in addition to, the ones described above.

In one embodiment, network 105 comprises one or more of a local area network (LAN), a wide area network (WAN) (e. g., the Internet), and/or any other interconnected data path across which multiple devices communicate. In another embodiment, the network 105 is a peer-to-peer network. Network 105 is coupled to or includes portions of a telecommunications network for sending data in a variety of different communication protocols. For example, network 105 is a 3G network or a 4G network. In yet another embodiment, network 105 includes Bluetooth communication networks or a cellular communications network for sending and receiving data such as via short messaging service (SMS), multimedia messaging service (MMS), hypertext transfer protocol (HTTP), direct data connection, Wireless application protocol (WAP), email, etc. In yet another embodiment, all or some of the links in network 105 are encrypted using conventional encryption technologies such as secure sockets layer (SSL), secure HTTP and/or virtual private networks (VPNs). In one embodiment, network 105 is not a traditional network, but a cloud utilizing cloud computing techniques. Cloud 105 can incorporate any cloud servers. For example, dental restoration server 101 can be a cloud server incorporated in cloud 105. Third party server 151 can also be a cloud server included in cloud 105. By incorporating these servers, cloud 105 can provide cloud services to design device 103, and/or client device 107 by utilizing cloud computing techniques.

Dental restoration server 101 receives dental restoration requests from client device 107 operated by client 175 such as a human client. In one embodiment, the dental restoration requests include scan dental models generated by scanner 109. In other embodiments, client 175 may send a physical model or impression of a patient's teeth along with the requests to dental restoration server 101 and the digital dental model can be created accordingly on the server side 101, e.g., by an administrator or technician operating on the server 101. Dental restoration server 101 creates and manages dental restoration cases based upon the received requests from client 107. For example, dental restoration server 101 may assign the created cases to appropriate design device 103 or third party server 151 to design a dental restoration according to the client's requests.

When the cases have been completed, dental restoration server 101 may route the complete design back to client 107. In one embodiment, dental restoration server 101 may be incorporated in cloud 105 to provide dental restoration services described herein.

In one embodiment, dental restoration server 101 can train deep neural networks for automatic recognition of dental information from dental models and identifies dental information of dental models associated with dental restoration cases or requests using the previously trained deep neural networks. For example, training module 123 may use many training data sets from a database 133 (e.g, scans of patients' dentition impressions) to train one or more deep neural networks, which can be a part of training module 123. In some embodiments, dental restoration server 101 may include a neural network module (not shown) that contains various deep learning neural networks such as convolutional networks, convolutional deep belief networks, recurrent neural networks, and generative adversarial networks.

Training data sets can be specifically designed to train one or more deep neural networks of training module 123 to identify certain dentition features, surface tooth anatomy, dental restorations, etc. For example, to train a deep neural network to identify a prepared tooth, many dentition/scan data sets—from real life cases—having a prepared tooth can be used as the training data sets for prepared tooth group. In another example, to train the deep neural network to recognize and learn various attributes (e.g., shape, size) of a crown, many training data sets from real dental patients with one or more crowns are selected to form a group of training data sets specifically for a crown. Database 133 can have many groups of training data sets, one group for each tooth number and/or for each dental feature, for example. Database 133 can also have a dedicated group of training data sets for the upper jaw, the opposing jaw, bridges, implants, bone graft locations, prepared tooth, and each attribute or aspect of a tooth surface anatomy (e.g, buccal and lingual cusps, distobucall and mesiobuccal inclines, distal and mesial cusp ridges, distolingual and mesiolingual inclines, occlusal surface, and buccal and lingual arcs).

Training module 123 may train one or more deep neural networks in real-time. In some embodiments, training module 123 may pre-train one or more deep neural networks using training data sets from database 133. In this way, restoration server 101 can readily use one or more pre-trained deep neural networks to recognize/identify, locate, and characterize many different dental information such as, but not limited to, upper and lower jaws, prepared and opposing jaws, tooth numbers, restoration types such as crown, inlay, bridge and implant, etc. Additional examples of dental information may include dental features (e.g., buccal and lingual cusps, occlusal surface, buccal and lingual arcs, etc.), margin lines, etc. As stated, dental restoration server 101 includes training module 123 and a scan recognition module 125a to perform the training of the deep neural networks and the automatic dental information recognition, respectively. The scan recognition modules 125a, and 125b, 125c, 125d (which are described below with reference to corresponding devices or servers) may be also individually or collectively referred to as the scan recognition module 125.

Database 133 can store data related to the deep neural networks and the identified dental information associated with the dental models. For example, database 133 can store data outputted by the deep neural networks such as identified dental information, which can be automatically generated by the deep neural networks. Dental restoration server 101 may then feed the automatically identified dental information of the dental models to design device 103 or third party server 151 for facilitating the restoration design. In one embodiment, dental restoration server 101 may send the identified dental information of the dental models to client device 107 for client's 175 review. Other embodiments of dental restoration server 101 may include different and/or additional components. Moreover, the functions may be distributed among the components in a different manner than described herein. Furthermore, system 100 may include a plurality of dental restoration servers 101 and/or other devices performing the work for a plurality of requesting clients 175.

Client device 107 can be an electronic device used by a human client 175 to perform functions such as receiving and/or reviewing scan dental models from scanner 109, submitting new dental restoration requests including dental models to dental restoration server 101 for design and/or fabrication, receiving and/or reviewing finished dental restoration model design from dental restoration server 101 through network 105, or receiving and/or checking identified dental information of the dental models. For example, client device 107 may be a smart phone, or a tablet, notebook, or desktop computer. Client device 107 can include and/or interfaces with a display device on which human client 175 may view the dental models, review the identified dental information of the dental models, or review complete dental restoration design.

In addition, client device 107 can provide a user interface (UI), such as physical and/or on-screen buttons, with which human client 175 may interact with client device 107 to perform functions such as submitting a new dental restoration request, receiving and reviewing identified dental information associated with dental models, receiving and reviewing a completed dental restoration design, etc.

In one embodiment, client device 107 may include a scan recognition module 125c for automatic recognition of dental information associated with the dental models. Therefore, client device 107 can directly identify the dental information of the dental models for client 175 to review and check. Scanner 109 may be any type of device for scanning a prepared tooth and its surroundings or a dental impression. Scanner 109 can generate a digital file of the scanned tooth and its surroundings or an impression of the teeth, and transmit the file to client device 107. For example, the digital file includes scan data and may represent a digital dental model. As described above, the dental model can be used by client 107 to create and send a dental restoration request to dental restoration server 101 for design and/or fabrication. In an alternative embodiment, client 175 can use the dental model to design a dental restoration locally—independently design the dental restoration itself.

Design device 103 may be interacted by user 147 to design the dental restoration requested by client 107. In one embodiment, design device 145 may be a smart phone, or a tablet, notebook, or desktop computer. User 147 may be a human operator, dental technician or designer, etc. Design device 103 may receive dental restoration design assignment from dental restoration server 101 and perform the design accordingly.

A design software (not shown in FIG. 1) used for digital design of the dental restoration can be installed in design device 103. The design software may provide library-based automatic dental restoration proposal for user 147 to accelerate and simplify the design process. In one embodiment, design device 103 may include a scan recognition module 125b for automatic recognition of dental information associated with the dental models. With the dental information (e.g., upper and lower jaws, prepared and opposing jaws, tooth numbers, restoration types such as crown, inlay, bridge and implant, buccal and lingual cusps, occlusal surface, buccal and lingual arcs, margin lines, etc.) being recognized, the design software can incorporate the dental information into the auto-proposal process to provide faster and better library-based restoration proposals.

Third party server 151 may be any one or more servers or devices providing dental restoration design to dental restoration server 101 through the network 105. In one embodiment, third party server 151 may be required to conduct an agreement with dental restoration server 101. In one embodiment, third party server 151 includes computing devices equipped with the same or different design software (not shown in FIG. 1) from the software installed in design device 103. In the illustrated embodiment, third party server 151 may install a scan recognition module 125d for performing the dental information recognition function to facilitate the design.

In one embodiment, third party server 150 may be included in cloud 105 to provide dental restoration design and/or fabrication services.

In one embodiment, dental restoration server 101 can train deep neural networks to perform qualitative evaluations of restoration designs. For example, the system may perform qualitative evaluations of one or more aspects of a restoration design, such as the margin line fit, contact surfaces with adjacent teeth, occlusion with the teeth of the opposing jaw, and contour of the restoration design. In the illustrated embodiment, dental restoration server 101 includes training module 123 and a qualitative evaluation module 135 to perform the training of the deep neural networks and the automatic qualitative evaluation, respectively.

In one embodiment, client device 107 may include a miniature 3D fabricator such as a milling machine or a 3D printer. In this embodiment, client 175 may locally generate a patient's dentition scan data using scanner 109. Client 175 may then upload the patient's 3D impression scan data to dental restoration server 101 using a dental restoration client (not shown), which may be part of client device 107. Client device 107 may include a pre-processing module (not shown) that converts the 3D impression scan data prior to uploading the data to restoration server 101. Client device 107 may pre-process the 3D impression scan data by converting the data to a depth map or spherical map. In one embodiment, the pre-processing of the scanned impression data can be performed by training module 123.

Client 175 may also select, using a dental restoration application/client residing on client device 107, a type of dental restoration to be modeled. For example, prior to uploading the patient's dentition scan data set (either in the original 3D format or a post-processed 2D format), the dental restoration client may ask client 175 to select one or more of the dental features or restorations to be modeled. In this example, client 175 can select a crown as the type of restoration to be modeled. Training module 123 of restoration server 101 can, in real-time and based on the selected restoration type to be modeled, select one or more training data sets in database 133 to train one or more deep neural networks. In one embodiment, training module 123 may select one or more pre-trained deep neural networks based on the selected restoration type to be modeled. For example, if the selected restoration type is a crown, training module 123 may select a deep neural network that has been extensively trained using dentition training data sets with crowns. In this way, client 175 does not have to wait for hours until one or more deep neural networks are trained.

Once the one or more deep neural networks are trained, scan recognition module 125a can use the trained deep neural network to generate a 3D model of a crown using one or more of the patient's dentition data sets. If the generated model is satisfactory to the evaluation module 135, dental restoration server 101 can send the generated model to client device 107. In one embodiment, qualitative evaluation module 135 may be a component of a generative adversarial network. For example, qualitative evaluation module 135 can be a discriminator network of the generative adversarial network. Once the discriminator cannot differentiate between the generated/simulated 3D model of a crown and a real/ideal 3D crown model, the 3D crown modeling process is completed.

Client 175 may then upload the generated model received from restoration server 101 to a fabricator such as a 3D printer, which then can fabricate the crown on site at the dental office. In this way, the entire process can be accomplished within an hour rather than days or weeks as possible with conventional technologies.

Computing System Architecture

Figure 2:
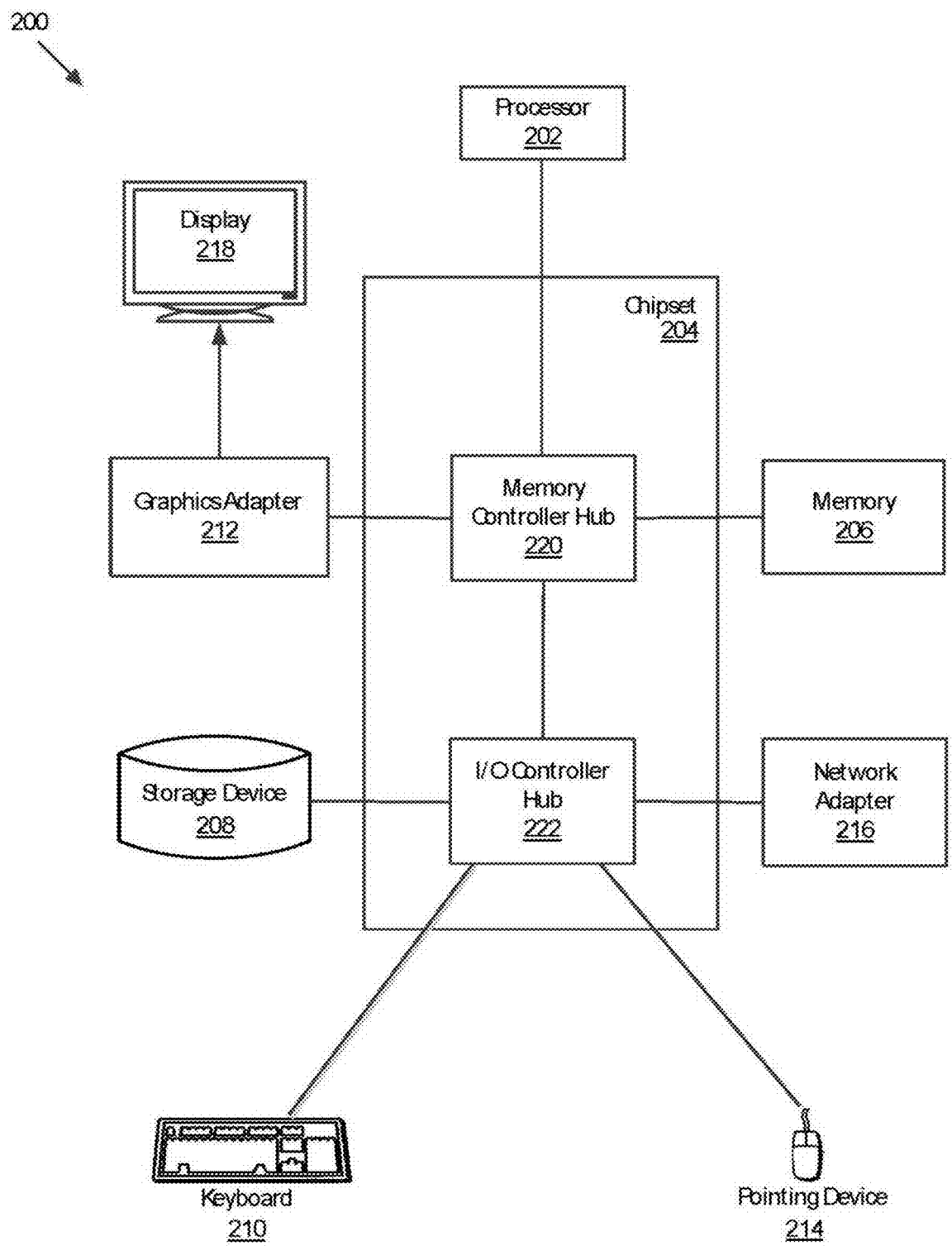
FIG. 2 is a high-level block diagram of a computing device according to one embodiment.

The entities shown in FIG. 1 are implemented using one or more computing devices. FIG. 2 is a high-level block diagram of a computing device 200 for acting as a dental restoration server 101, a design device 145, a third party server 151, and/or a client device 107, or a component of the above. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212.

In one embodiment, the functionality of the chipset 204 is provided by a memory controller hub 220 and an I/O controller hub 222. In another embodiment, the memory 206 is coupled directly to the processor 202 instead of the chipset 204. The storage device 208 is any non-transitory computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218.

Network adapter 216 couples the computer system 200 to the network 105. As is known in the art, a computing device 200 can have different and/or other components than those shown in FIG. 2. In addition, computing device 200 can lack certain illustrated components. Moreover, storage device 208 can be local and/or remote from computing device 200 (such as embodied within a storage area network (SAN)).

As is known in the art, computing device 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules such as training module 123 and scan recognition module 125 are stored on storage device 208, loaded into memory 206, and executed by processor 202.

Exemplary Scan Data Representation

Figure 3:
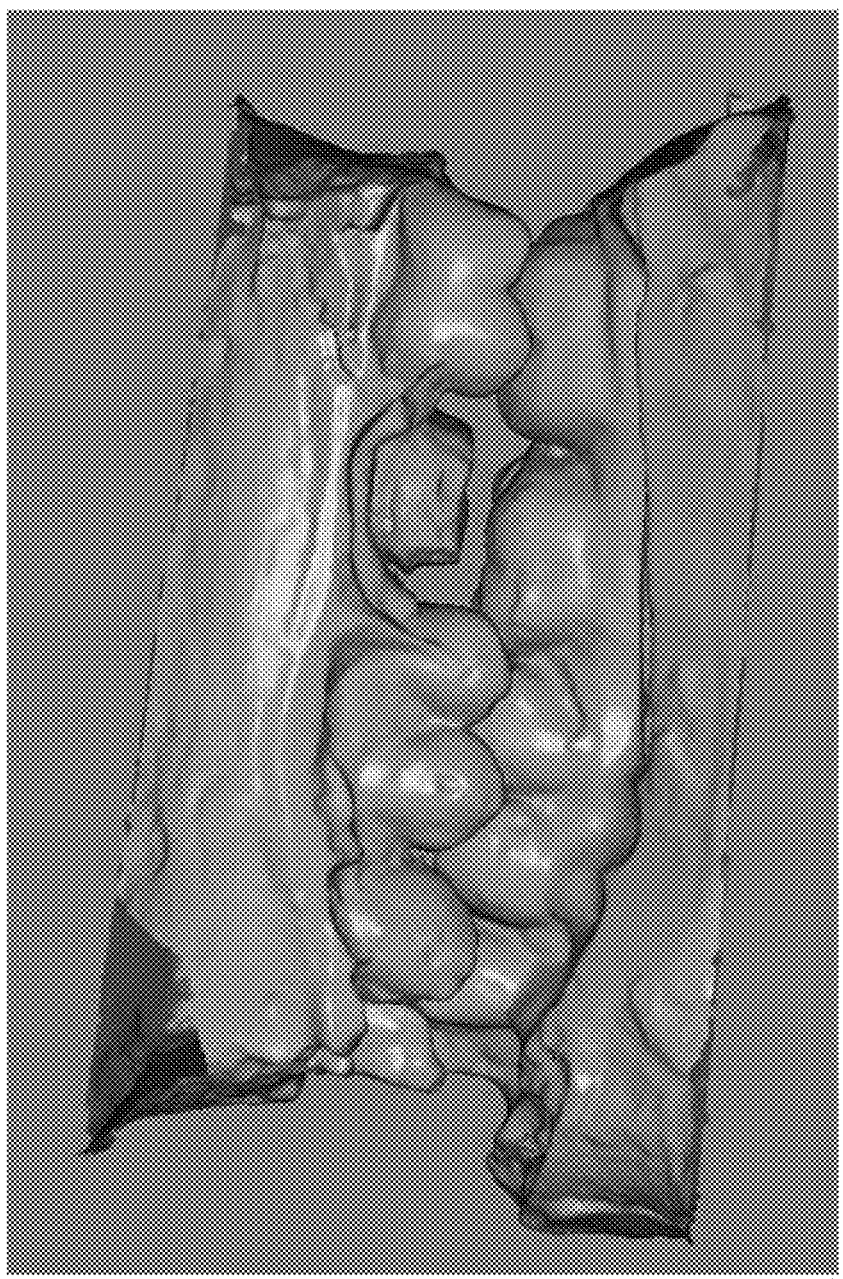
FIG. 3 is a graphic representation showing a two dimensional (2D) representation of a three dimensional (3D) dental model of a portion of a patient's dentition according to one embodiment.

Referring now to FIG. 3, a graph showing a two dimensional (2D) representation 300 of a three dimensional (3D) dental model of a portion of a patient's dentition is illustrated according to one embodiment. As described above, a 3D digital image or file representing a portion of a patient's dentition can be acquired by a direct intraoral scan of the patient's teeth, indirectly by scanning an impression or a physical model of the patient's teeth, or by other methods known to those skilled in the art. In one embodiment, a plurality of scans can be conducted to obtain a suitable image of the patient's oral or dental anatomy and the plurality of scans can be assembled into a 3D digital image or file, which is also referred to as a "dental model" or "digital dental model" herein.

However, in order to train a deep neural network to recognize dental information or features associated with the dental models, the raw 3D scan data is difficult to apply as the suitable training data, due to the architecture of the deep neural network, and the complicacy of the convolution and/or other types of transformation involved in the deep neural networks. For example, the 3D data format of the dental models is very hard to apply to convolution transformation.

The vast majority of deep neural networks have been dealing with 2D data representation, e.g., 2D image. One way of converting a 3D dental model into a 2D data representation is to render it on the screen and generate a snapshot, as shown in FIG. 3, which nevertheless causes unnecessary difficulties. For example, this way of conversion depends on the particular rendering settings (e.g., color, resolution, brightness, contrast, etc.) that may vary.

Different rendering settings lead to different 2D data representations (e.g., snapshots) even for the same 3D dental model.

The variability of the data representations further causes problems when being used to train the deep neural networks as training data. Extra effort is needed to remove the variability between data representations rendered under different settings before using them as training data.

Figure 4A:
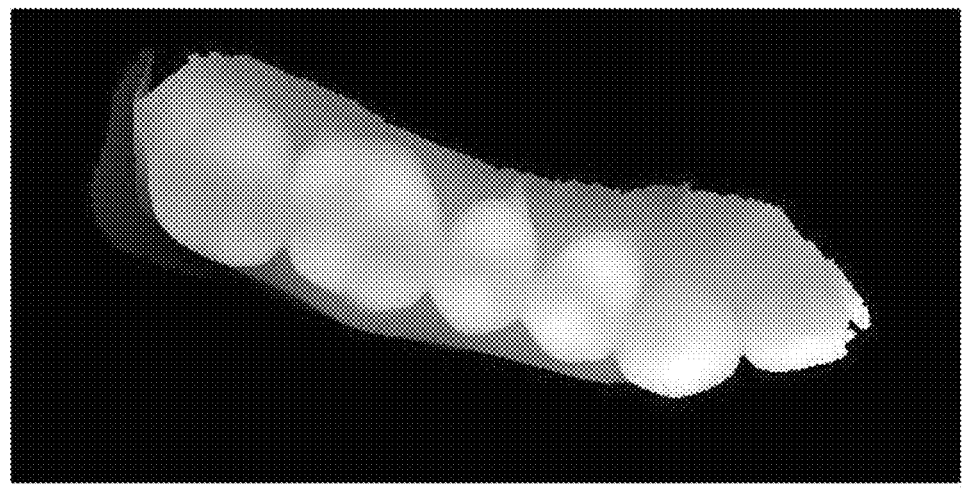
FIGS. 4A-4C are images of depth maps generated from a 3D dental model of a portion of a patient's dentition according to one embodiment.
Figure 4B:
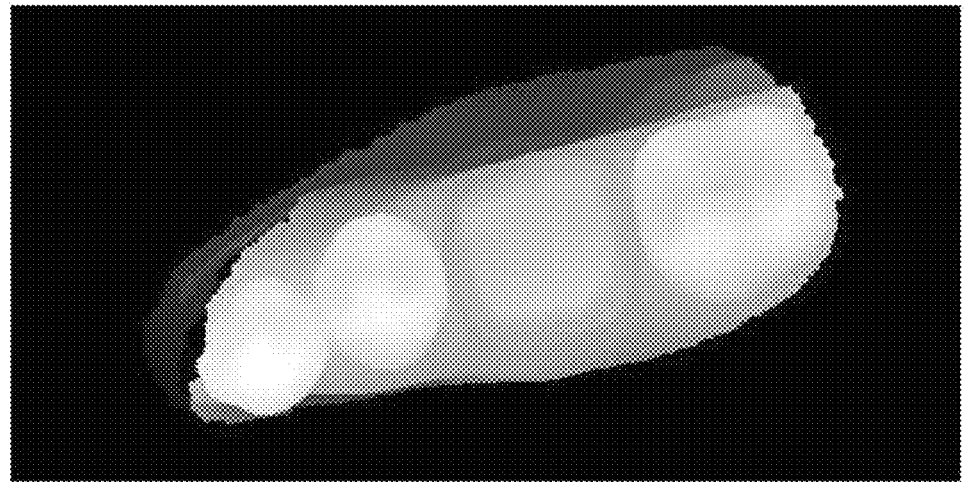
Figure 4C:
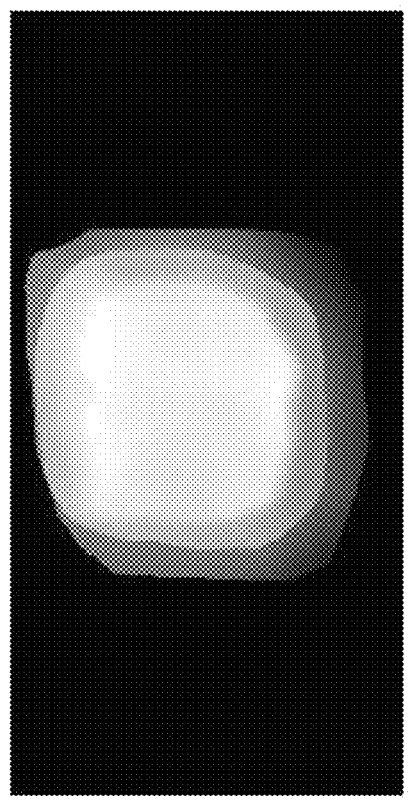

Therefore, in one embodiment, the present system 100 uses a pure geometric approach to generate 2D data representations of the 3D dental models. For example, system 100 generates depth maps from a given plane and saves the depth maps as bitmap images, as shown in FIGS. 4A-4C. FIGS. 4A-4C are images of depth maps 400, 420, 450 generated from a 3D dental model of a portion of a patient's dentition according to one embodiment. In the bitmap images, the actual depth is encoded in each pixel. This pure geometric approach does not depend on computer graphics and thus avoids the variability problem caused by varying computer rendering settings.

In one embodiment, the depth maps are generated from the 3D dental models through coordinate transformation. For example, the 3D dental model is a digital file of a point cloud, where each pixel is associated with a three dimensional coordination (x, y, z).

By setting a plane (such as the plane of the scene camera), the depth map can be generated by converting the three dimensional coordination of each pixel to a perpendicular distance from the plane. The depth maps can show luminance in proportion to the distance from the plane, as shown in FIGS. 4A-4C.

In one embodiment, in order to train the deep neural network (or deep neural networks) for recognizing upper and lower jaws, the 3D dental models are segmented to generate depth maps of lower jaws and depth maps of upper jaws respectively. For example, the depth maps 400, 420 shown in FIGS. 4A-4B represent a lower jaw and an upper jaw, respectively. In addition, the prepared tooth may also be separated from the whole 3D dental models to generate a separate depth map, such as the depth map 450 shown in FIG. 4C. Thus the deep neural network for identifying a prepared tooth can be trained using the depth maps of prepared tooth. Similarly, the depth maps 400, 420 in FIGS. 4A-4B may also represent a prepared jaw and an opposing jaw, respectively, and can be used to train deep neural network (or deep neural networks) for recognizing prepared jaws and opposing jaws.

Figure 4D:
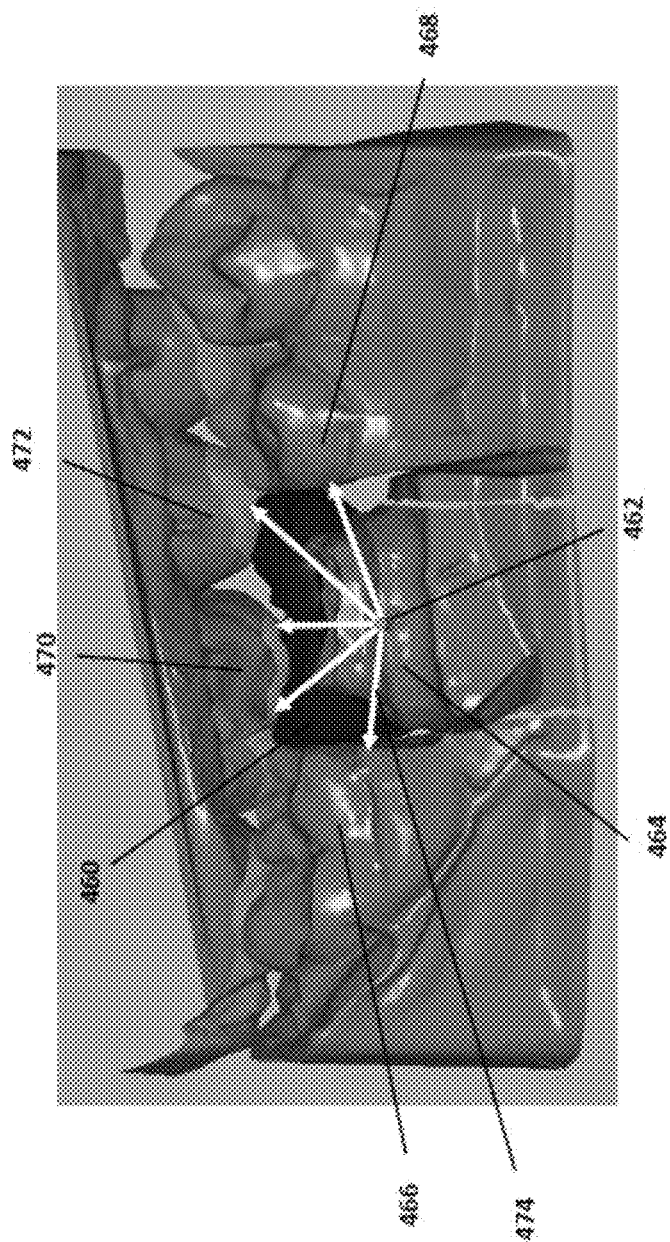
FIG. 4D is a graphic representation showing a two dimensional (2D) representation of a three dimensional (3D) dental model of a portion of a patient's dentition and showing a manner of generating a spherical distance map for a tooth preparation within the patient's dentition.

In another embodiment, the present system 100 uses another geometric approach to generate 2D data representations of the 3D dental models. For example, as shown in FIG. 4D, system 100 generates a spherical distance map 460 that is computed from the center 462 of a prepared tooth 464 to adjacent teeth 466, 468 and antagonist teeth 470, 472. The generation of the spherical distance map 460 by system 100 is illustrated graphically by a plurality of rays 474 originating from the center 462 of the prepared tooth to determine the distance from the center 462 to the adjacent dentition. Spherical distance map 460 is then parameterized on a given plane (e.g., the plane of the scene camera) in order to be consumable by the deep neural network model. Spherical distance map 460 can show a surface defined by the distance from center 462 of prepared tooth 464 relative to the adjacent and opposed dentition, as shown in FIG. 4D.

In one embodiment, the conversion of 3D scan data into 2D data may be performed by a data processing module (not shown) of restoration server 101. The data processing (or pre-processing) module can be an independent module within restoration server 101, a component of training module 123, or an independent component of a separate server. The data processing module can also reside on the client side as part of a data restoration application/client, which can reside on client device 107 or scanner 109.

Exemplary Deep Neural Network Structure

Figure 5A:
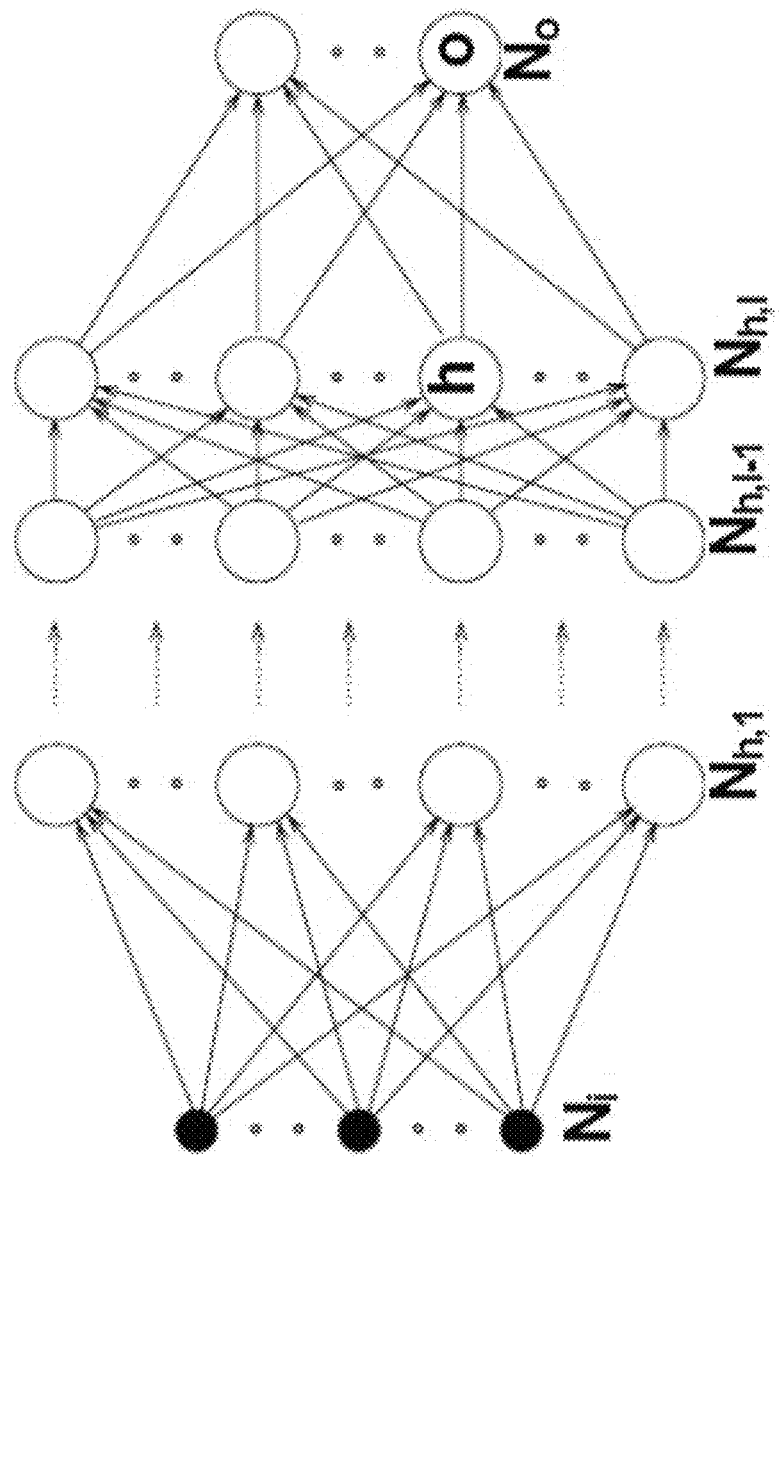
FIG. 5A is a high-level block diagram showing a structure of a deep neural network according to one embodiment.

Referring to FIG. 5A, illustrated is a high-level block diagram showing the structure of a deep neural network 500 according to one embodiment. Deep neural network 500 includes multiple layers $N_i$, $N_{h,1}$, $N_{h,l-1}$, $N_{h,l}$, $N_o$, etc., as shown in FIG. 5A. The first layer $N_i$ is a layer of input. For example, the deep neural networks used in the present disclosure may have the scan data (such as the dental models) or preprocessed scan data (such as the depth maps or spherical distance maps) as input, which has been described in detail with reference to FIGS. 3-4D. As a further example, the deep neural networks used in the present disclosure may also have a restoration design or preprocessed restoration design as input, which is described further below with reference to FIGS. 12A-C. The last layer $N_o$ is a layer of output, denoted as node "o" in FIG. 5A. The deep neural networks used in the present disclosure may output probabilities. For example, the output can be a probability vector that includes one or more probability values of each feature or aspect of the dental models belonging to certain categories.

There can be different classifications. For example, one classification can include two categories, e.g., lower jaw and upper jaw. Another classification can include two categories of prepared jaw and opposing (non-prepared) jaw. Other classifications can use tooth numbers (e.g., 32 tooth numbers), restoration types (e.g., crown, inlay, bridge, implant, etc.), or feature types (e.g., buccal and lingual cusp, occlusal surface, buccal and lingual arc, etc.) as categories respectively. For each classification, a corresponding deep neural network can be created and used.

In another embodiment, the deep neural networks used in the present disclosure may have output of one or more results of a qualitative evaluation or a plurality of qualitative evaluations. For example, in an embodiment, the output is an evaluation of the presence or absence of defects in one or more aspects of the restoration design relative to the scan data of a patient's dental model. Examples of aspects of restoration design that may be subject to evaluation include fit of the restoration design relative to the margin line of the prepared tooth, proximity of the restoration design to the contact surfaces of adjacent teeth, occlusion proximity of the restoration design relative to the teeth of the opposing jaw, and contour of the restoration design. For each restoration design aspect undergoing evaluation, a corresponding deep neural network can be created and used.

Each layer N can include a plurality of nodes that connect to each node in the next layer N+1. For example, each computational node in the layer $N_h$, l-1 connects to each computational node in the layer $N_{h,1}$. The layers $N_{h,1}$, $N_{h,l-1}$, $N_{h,l}$, between the input layer $N_i$ and the output layer $N_o$ are hidden layers. The nodes in the hidden layers, denoted as "h" in FIG. 5, can be hidden variables. In one embodiment, the deep neural networks 500 used in the present disclosure can include multiple hidden layers, e.g., 5, 10, 15, 20, 24, 25, 30, etc. It has been tested that a deep neural network with many hidden layers may achieve a satisfying recognition result for the present applications. In one embodiment, deep neural network 500 can have at least 24 hidden layers.

In one embodiment, deep neural network 500 may be a deep feedforward network. Alternatively, deep neural network 500 can be a recurrent neural network (RNN), which is a deep feedforward network having outputs that are fed back into itself. Deep neural network 500 can also be a convolutional neural network, which is a network that uses convolution in place of the general matrix multiplication in at least one of the hidden layers of the deep neural network. In one embodiment, training module 123 may use training data sets with labels to supervise the learning process of the deep neural network. The labels are used to map a feature to a probability value of a probability vector. Alternatively, training module 123 may use unlabeled training data sets to train, in an unsupervised manner, generative deep neural networks that do not necessarily require labeled training data sets.

Referring back to FIG. 1, training module 123 may use dentition training data sets to train one or more deep neural networks with such a structure 500 (FIG. 5A) or 550 (FIG. 5B) for recognizing dental information and/or features within each of the training data set. In one embodiment, training module 123 may receive training data sets representing patients' dentitions. For example, each dentition training data set can be a portion of a 3D dental model of one or more portions of a patient's dentition. As described above, 3D dental models can be received along with the clients' requests for dental restorations. Alternatively, 3D dental models can be generated at the dental labs by scanning impressions or physical models of the patients' teeth.

In one embodiment, training module 123 may preprocess the dentition training data sets. For example, training module 123 may generate 2D depth maps (e.g., saved as bitmap images) and/or spherical distance maps from the 3D dental models of the dentition training data sets. In one embodiment, training module 123 may segment one or more 3D dental models into separate portions of dentitions, e.g., upper and lower jaws, or prepared and opposing jaws, and create depth maps and/or spherical distance maps of the separate portions. For example, the training module 123 generates a depth map of a lower jaw, a depth map of an upper jaw and a depth map of the prepared tooth, as shown in FIGS. 4A-4C. In another example, training module 123 may segment one or more 3D dental models into portions of individual teeth with different tooth numbers, e.g., tooth number 1-32. Training module 123 can generate a depth map for each individual tooth. In yet another example, training module 123 can segment one or more 3D dental models into one or more data set portions. For instance, a separate data set can be generated for each dental feature (e.g., cusps, margin lines, tooth number, dental restoration, prepared tooth, etc), and a depth map can be generated for each of the segmented portions.

Training module 123 can train one or more deep neural networks to map the preprocessed one or more training data sets to one or more probability vectors. The probability vector includes one or more probability values indicating the probability of the dentition portion represented by the dentition training data set belonging to each one of a set of categories (according to one classification). Training module 123 may train a deep neural network so that the output of the deep neural network (e.g., the probability vector) indicates the category of the dentition portion represented by the dentition training data set. In one embodiment, the highest probability value in the vector corresponds to the category of the dentition portion represented by the training data set. For example, assume that the training data set is a large number of depth maps representing patients' upper jaws and/or depth maps representing patients' lower jaws. Training module 123 may use the training data set (containing many scanned images or depth maps of upper and lower jaws) to train a deep neural network for recognizing an upper jaw and/or lower jaw from newly received dental models (e.g., a patient's scan data). In this example, the deep neural network is trained to map the depth maps of upper jaws to a probability vector that includes one or more probability values indicating the probabilities of the depth maps belonging to an upper jaw or a lower jaw—the probability value indicating the depth maps belonging to the upper jaw is the highest in the vector, or substantially higher than the probability value indicating the depth maps belonging to the lower jaw.

Similarly, the deep neural network is trained to map the depth maps of upper and lower jaws to a probability vector including probability values indicating the probabilities that the depth maps belonging to an upper jaw and a lower jaw. In this instance, the probability value indicating that the depth maps belonging to the lower jaw is the highest in the vector, or substantially higher than the probability value indicating that the depth maps belonging to the upper jaw. Therefore, the deep neural network is trained such that when a patient's scan data (patient's scanned dental 3D model) is input into the deep neural network, the deep neural network can return a resulting probability vector indicating the category (e.g., upper jaw or lower jaw) in which the patient's scan data belongs, which corresponds to the highest probability value in the vector.

In one embodiment, training module 123 may train a deep neural network to map the training data set to a probability vector that includes probability of each one of a set of dental features being present in a portion of a patient' dentition. The deep neural network is trained to detect a certain dental feature being present in the portion of the patient's dentition based on the highest probability value in the vector. For example, training module 123 uses depth maps of individual teeth with different tooth numbers (e.g., tooth number 1-32) to train a deep neural network by mapping the depth maps of individual teeth to a probability vector that includes probability of each tooth (with a certain tooth number) being present in the depth map. For example, the depth map of a tooth with number 14 is mapped by the deep neural network to a probability vector including probabilities of teeth with each tooth number being present. The probability of the tooth with number 14 is the highest in the probability vector. Other probabilities (e.g., the other 31 probabilities corresponding to the other tooth numbers) can be substantially lower. Similarly, the deep neural network can map a depth map of a tooth with a different tooth number from 14 to a different probability vector having the probability of the different tooth number being present as the highest.

In one embodiment, the dental feature can also include a set of different types of cusps or arcs (e.g., buccal cusp, lingual cusp, occlusal cusp, buccal arc, lingual arc, etc.), a dental preparation, a lower jaw or an upper jaw, a prepared jaw or the opposing jaw, a set of restorations with different types, etc. In one embodiment, multiple deep neural networks can be trained to perform the above-described functions respectively. For example, training module 123 trains a deep neural network for teeth of each tooth number and the deep neural network for each tooth number can be used to recognize if a tooth of this certain tooth number is present.

In one embodiment, training module 123 trains a deep neural network to locate a certain dental feature present in the portion of the patient's dentition. For example, the dental feature is a margin line. Other examples of the dental feature can include a set of different types of cusps or arcs (e.g., buccal cusp, lingual cusp, occlusal cusp, buccal arc, lingual arc, etc.), a dental preparation, a lower jaw or an upper jaw, a prepared jaw or the opposing jaw, a set of restorations with different types, etc. The deep neural network is trained not only to detect if a dental feature is present, but also to detect where the dental feature is in the dental model.

In one embodiment, training module 123 trains a deep neural network to provide a qualitative evaluation of a certain aspect of a dental restoration design. For example, the aspect of the dental restoration design may be the contour. Other examples of the dental restoration design aspect can include the margin line fit (i.e., the degree to which the restoration design aligns with the margin line of the prepared tooth), the contact areas (i.e., the proximity of the external surface of the restoration design to the facing surfaces of the adjacent teeth), the occlusion with the teeth of the opposing jaw (i.e., the proximity of the occlusal surface of the restoration design to the occlusal surfaces of the teeth of the opposing jaw), etc. The deep neural network is trained to identify the presence of defects in the aspect of the restoration design undergoing qualitative evaluation and to provide an evaluation assessment as an output.

During the running stage, scan recognition module 125 receives scan data of a dentition. For example, scan recognition module 125 receives a 3D scan dental model attached with a client's restoration request. In other examples, scan recognition module 125 may receive a 3D dental model generated and uploaded to the server by a lab technician through scanning a physical model or an impression. In one embodiment, scan recognition module 125 preprocesses the scan data. For example, scan recognition module 125 preprocesses the dental model similarly as training module 123 preprocesses the training data set.

Scan recognition module 125 may convert the 3D dental model into a 2D depth map and/or a spherical distance map representing a portion of the patient's dentition. For example, the scan recognition module 125 may generate one or more depth maps and/or spherical distance maps representing different portions of the patient's dentition, e.g., different jaws, individual teeth, prepared tooth, etc. In one embodiment, scan recognition module 125 may also preprocess the scan data by segmenting the scan data into sub-images representing different portions, e.g., different jaws, individual teeth, prepared tooth, etc.

Scan recognition module 125 can apply the trained one or more deep neural networks to the preprocessed scan data. For example, scan recognition module 125 can apply the trained deep neural networks by using the one or more depth maps and/or spherical distance maps of the received dental model as input. The pre-trained deep neural networks can return probability vectors indicating the categories of the depth maps. Scan recognition module 125 can recognize dental information based on the output of the pre-trained deep neural networks. For example, scan recognition module 125 can recognize the upper and lower jaws based upon the highest probabilities in the output probability vectors. Scan recognition module 125 can also recognize prepared jaw and opposing jaws, prepared tooth (e.g., the tooth number of the prepared tooth), tooth numbers of other teeth in the dental models, restoration types (e.g., crown, inlay, bridge, implant, etc.), feature types (e.g., cusps) and margin lines.

In one embodiment, scan recognition module 125 may detect a certain dental feature present in the dental model by using the deep neural network. For example, scan recognition module 125 can apply the deep neural network onto an un-segmented dental model that includes multiple portions of the patient's dentition, or one depth map representing multiple portions of the patient's dentition. Scan recognition module 125 can detect whether a certain feature (e.g., a prepared jaw, a prepared tooth, a tooth with a certain tooth number, a certain cusp or arch, a restoration type, or a margin line) is present in the dental model or depth map. In some embodiments, scan recognition module 125 can also locate the features and margin lines in the dental model. For example, scan recognition module 125 can detect where a certain type of features are and where the margin lines are on the teeth based upon the pre-trained deep neural networks. These detected features or margin lines can then be labeled on the dental models.

Figure 5B:
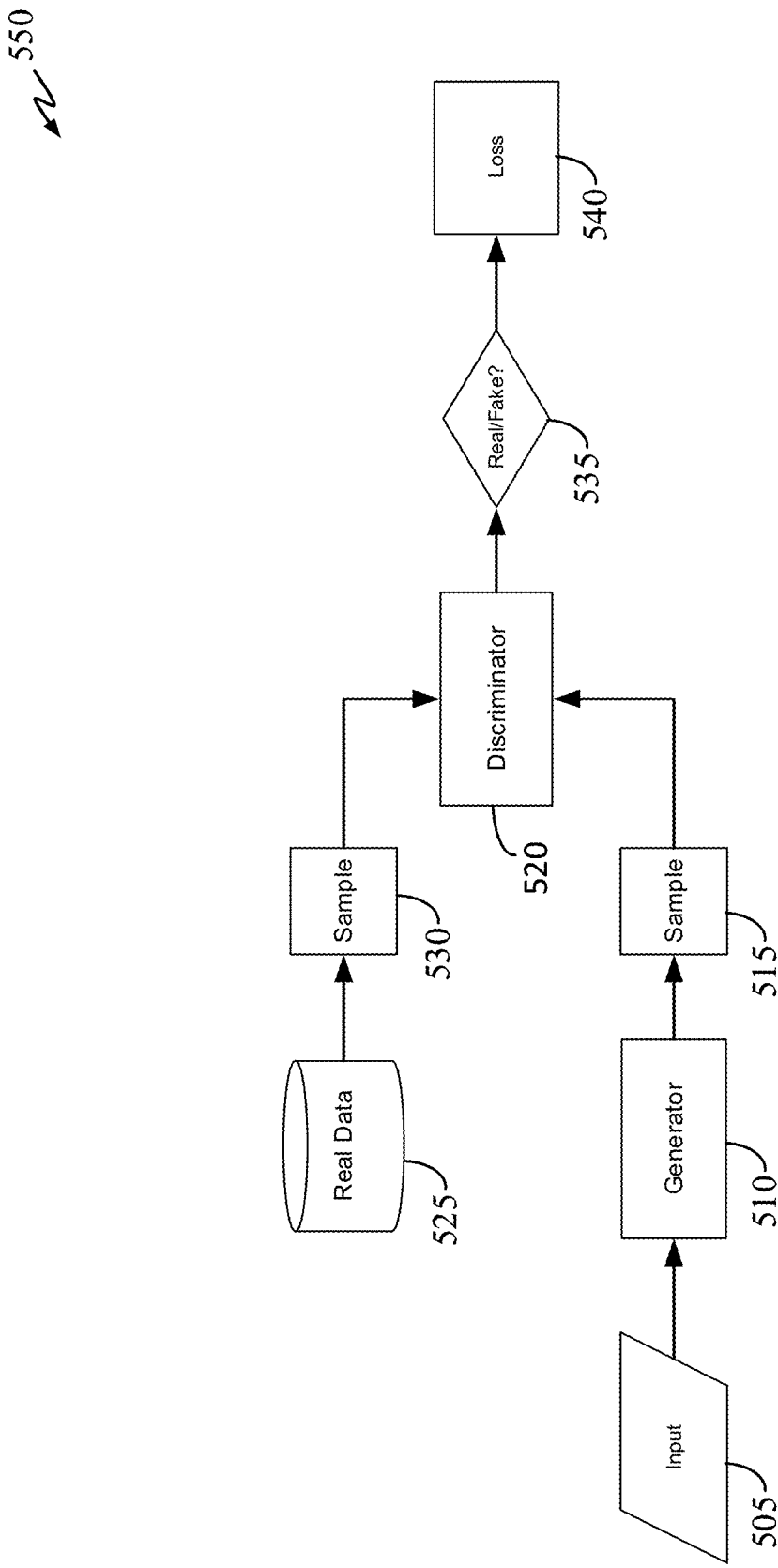
FIG. 5B is a high-level block diagram showing a structure of a deep neural network according to one embodiment.

FIG. 5B is a high-level block diagram illustrating a structure of a generative adversarial network (GAN) 550 that can be employed to model dental anatomical features and restorations in accordance with some embodiments of the present disclosure. On a high level, GAN 550 uses two independent neural networks against each other to generate an output model that is substantially indistinguishable when compared with a real model. In other words, GAN 550 employs a minimax optimization problem to obtain convergence between the two competing neural networks. GAN 550 includes a generator neural network 510 and a discriminator neural network 520. In one embodiment, both neural network 510 and discriminator neural network 520 are deep neural networks structured to perform unstructured and unsupervised learning. In GAN 550, both the generator network 510 and the discriminator network (discriminating deep neural network) 520 are trained simultaneously. Generator network 510 is trained to generate a sample 515 from the data distribution input 505. Discriminator network 520 is trained to provide a probability that sample 515 belongs to a training data sample 530 (which comes from a real sample, real data 525) rather than one of the data sample of input 505. Generator network 510 is recursively trained to maximize the probability that discriminator network 520 fails to distinguish apart (at 535) a training data set and an output sample generated by generator 510.

At each iteration, discriminator network 520 can output a loss function 540, which is used to quantify whether the generated sample 515 is a real natural image or one that is generated by generator 510. Loss function 540 can be used to provide the feedback required for generator 510 to improve each succeeding sample. In one embodiment, in response to the loss function, generator 510 can change one or more of the weights and/or bias variables and generate another output.

In one embodiment, training module 123 can simultaneously train two adversarial networks, generator 510 and discriminator 520. Training module 123 can train generator 510 using one or more of a patient's dentition scan data sets to generate a sample model of one or more dental features and/or restorations. For example, the patient's dentition scan data can be 3D scan data of a lower jaw including a prepared tooth and its neighboring teeth. Simultaneously, training module 123 can train discriminator 520 to distinguish a generated sample of a crown for the prepared tooth (generated by generator 510) against a sample from a crown from a real data set (a collection of multiple scan data set having crown images). In one embodiment, GANs are designed for unsupervised learning, thus input 505 and real data 525 (e.g., the dentition training data sets) can be unlabeled.

Exemplary Recognition Results

Figure 6:
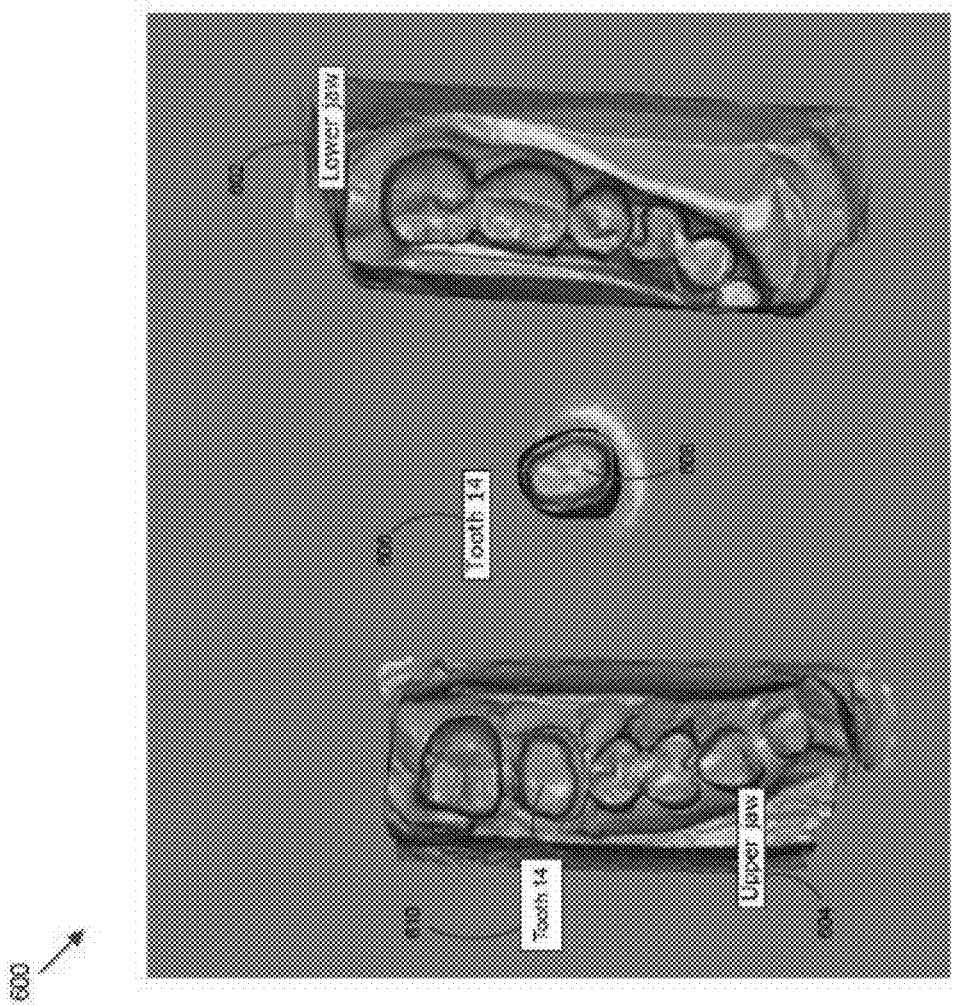
FIG. 6 is a graphic representation showing a recognized dental information associated with a dental model of a portion of a patient's dentition according to one embodiment.

Referring now to FIG. 6, illustrated is a graphic representation 600 showing recognized dental information associated with a dental model of a portion of a patient's dentition according to one embodiment. Elements 602 is a graphic representation of a label 602 indicating that the jaw in the dental model with which the label 602 is attached is a lower jaw. Similarly, element 604 is a graphic representation of a label 604 indicating that the jaw in the dental model with which the label 604 is attached is an upper jaw. Element 606 is a graphic representation of a label 606 indicating tooth number (e.g., tooth 14) of the prepared tooth that is represented by element 608 graphically. Element 610 is a graphic representation of a label 610 pointing to the prepared tooth in the dental model. This way the label 610 indicates where the prepared tooth is in the jaw.

Figure 7:
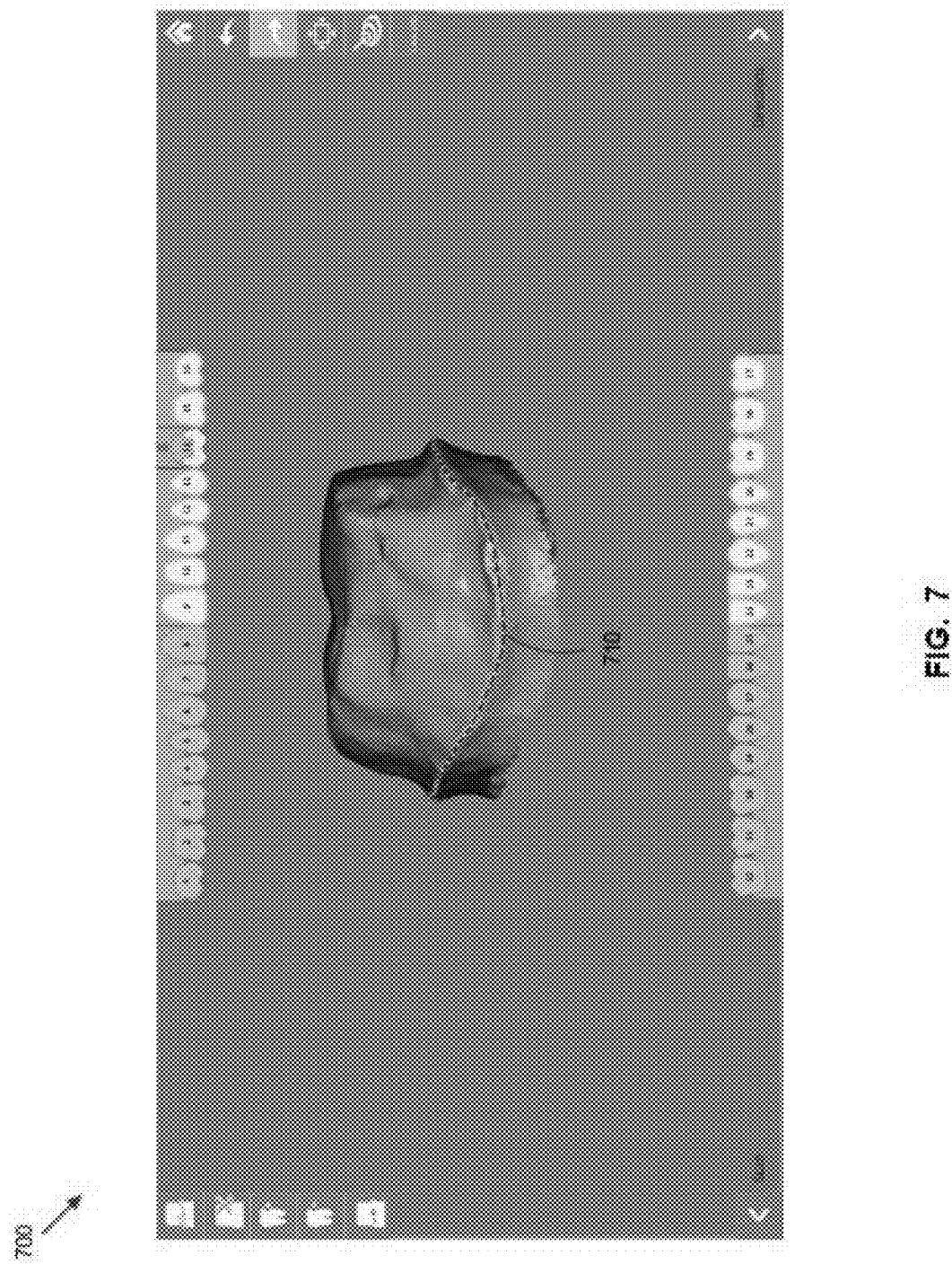
FIG. 7 is a graphic user interface showing a detected margin line of a preparation from a dental model of a portion of a patient's dentition according to one embodiment.

FIG. 7 depicts a graphic user interface 700 showing detected margin line of a preparation from dental model of a portion of a patient's dentition according to one embodiment. Element 710 is a graphic representation of a margin line associated with the prepared tooth, e.g., the prepared tooth 606 with the tooth number 14 as shown in FIG. 6.

Figure 8:
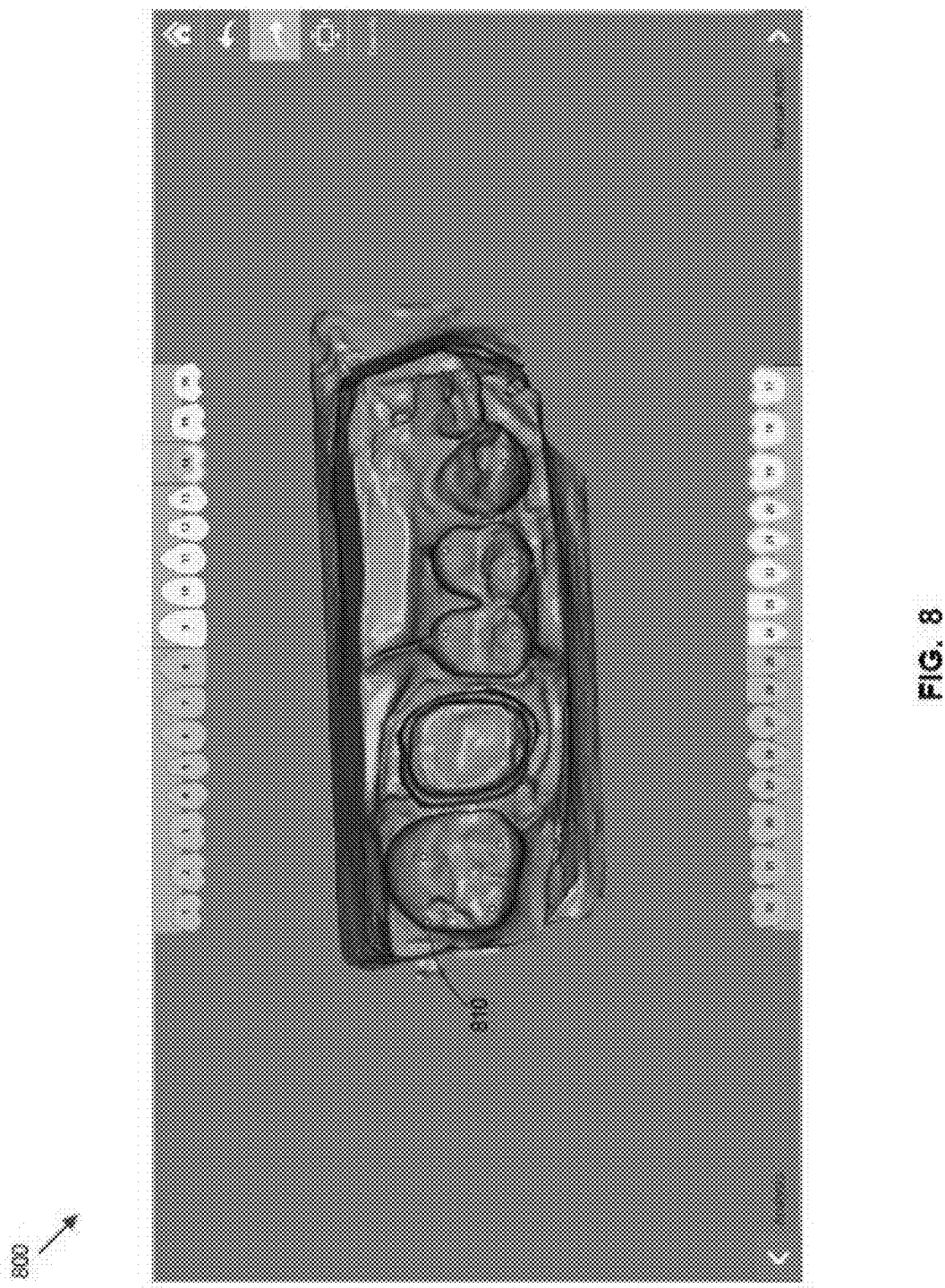
FIGS. 8 and 9 are graphic user interfaces showing detected cusps from a dental model of a portion of a patient's dentition according to one embodiment.
Figure 9:
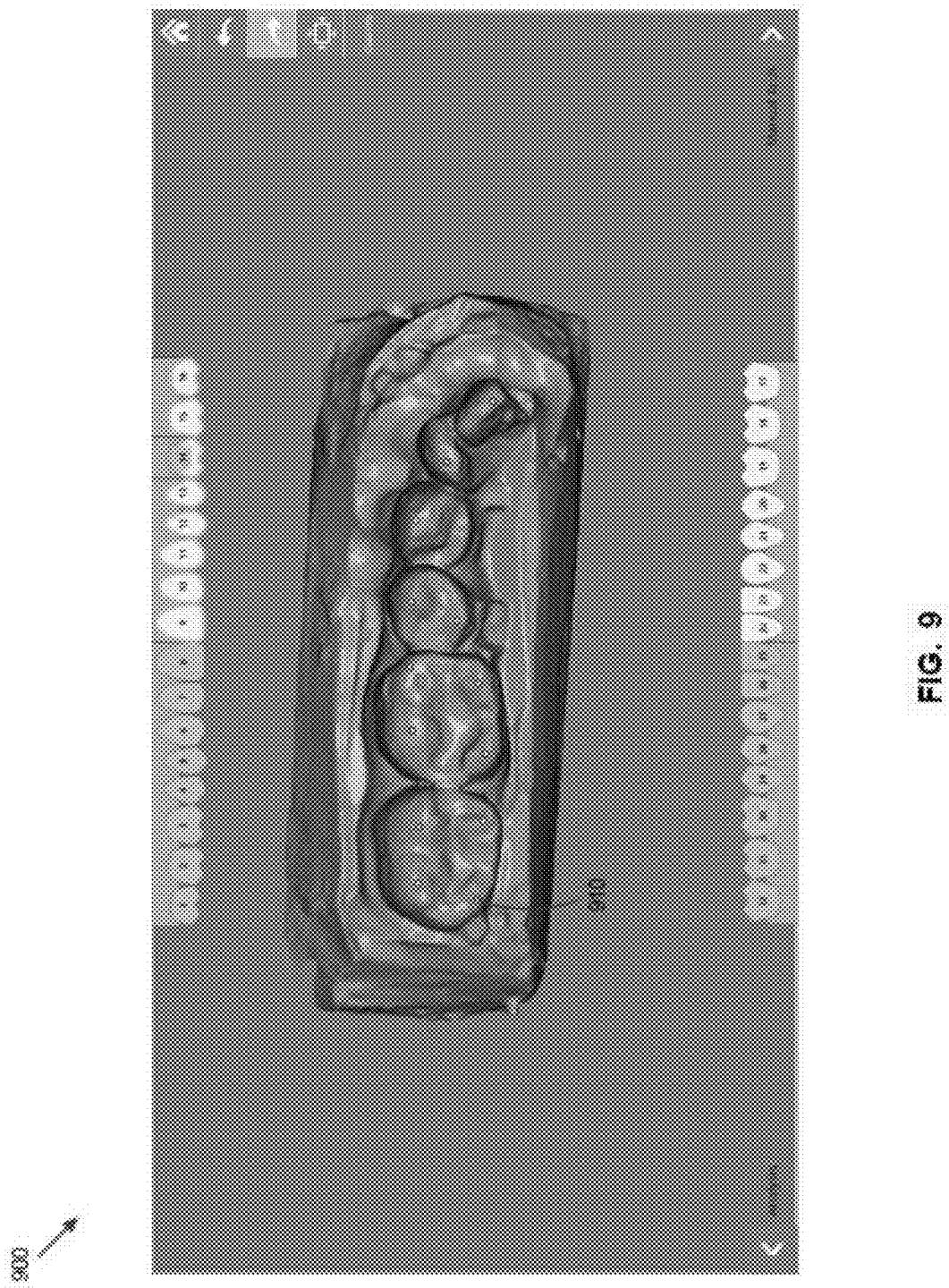

FIGS. 8 and 9 are graphic user interfaces 800, 900 showing detected cusps from dental model of a portion of a patient's dentition according to one embodiment. In FIG. 8, element 810 is a graphic representation of one of those detected cusps on the prepared jaw in the dental model. In FIG. 9, element 910 is a graphic representation of one of those detected cusps on the opposing jaw in the dental model.

Exemplary Qualitative Evaluation Results

Referring now to FIGS. 12A-C, illustrated are three views (buccal view, distal to mesial view, and occlusal view) of a graphic representation 1200 showing a dental model of a portion of a patient's dentition 1210 according to one embodiment. A proposed restoration design 1212 is shown attached to a prepared tooth of the patient's dentition. Graphic representation 1200 is of a type that is presented in commercially available dental design software used to design dental restorations.

Figure 13:
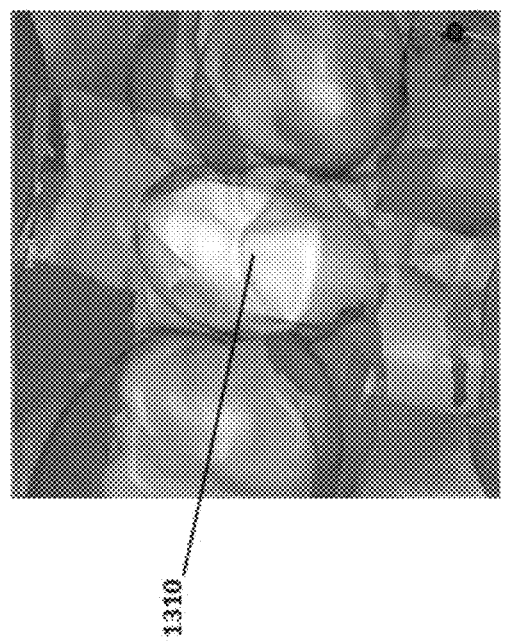
FIG. 13 is a graphic representation of a qualitative evaluation of a contour of a restoration design.

In one embodiment, data associated with restoration design 1212 is preprocessed and is provided as an input to a deep neural network previously trained for qualitative evaluation of a contour aspect of a restoration design. For example, three depth maps corresponding with the occlusal, buccal, and lingual views of restoration design 1212 are provided. As shown graphically in FIG. 13, a qualitative evaluation 1310 of the contour of the restoration design is performed by the trained deep neural network, within which the deep neural network identifies the presence or absence of defects in the contour of the restoration design. At the conclusion of the qualitative evaluation, the deep neural network provides as an output a qualitative evaluation assessment of the contour of the restoration design.

Figure 14:
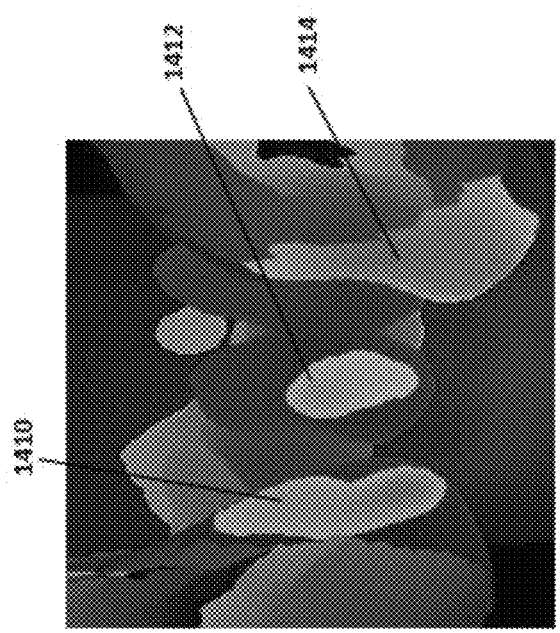
FIG. 14 is a graphic representation of a qualitative evaluation of contact areas of a restoration design relative to adjacent teeth contained within a portion of a patient's dentition.

In another embodiment, data associated with restoration design 1212 is preprocessed and is provided as an input to a deep neural network previously trained for qualitative evaluation of the contact areas of a restoration design relative to the patient's dentition. For example, three depth maps corresponding with the occlusal, buccal, and lingual views of restoration design 1212 are provided. Also provided is a preprocessed scan data for a portion of a patient's dentition 1210. For example, a spherical distance map corresponding with the portion of a patient's dentition 1210 is provided. As shown graphically in FIG. 14, a qualitative evaluation of the contact areas 1410, 1412, 1414 of the restoration design relative to the patient's adjacent dentition is performed by the trained deep neural network, within which the deep neural network identifies the presence or absence of defects in the contact areas of the restoration design. At the conclusion of the qualitative evaluation, the deep neural network provides as an output a qualitative evaluation assessment of the contact areas of the restoration design.

Exemplary Methods

Figure 10A:
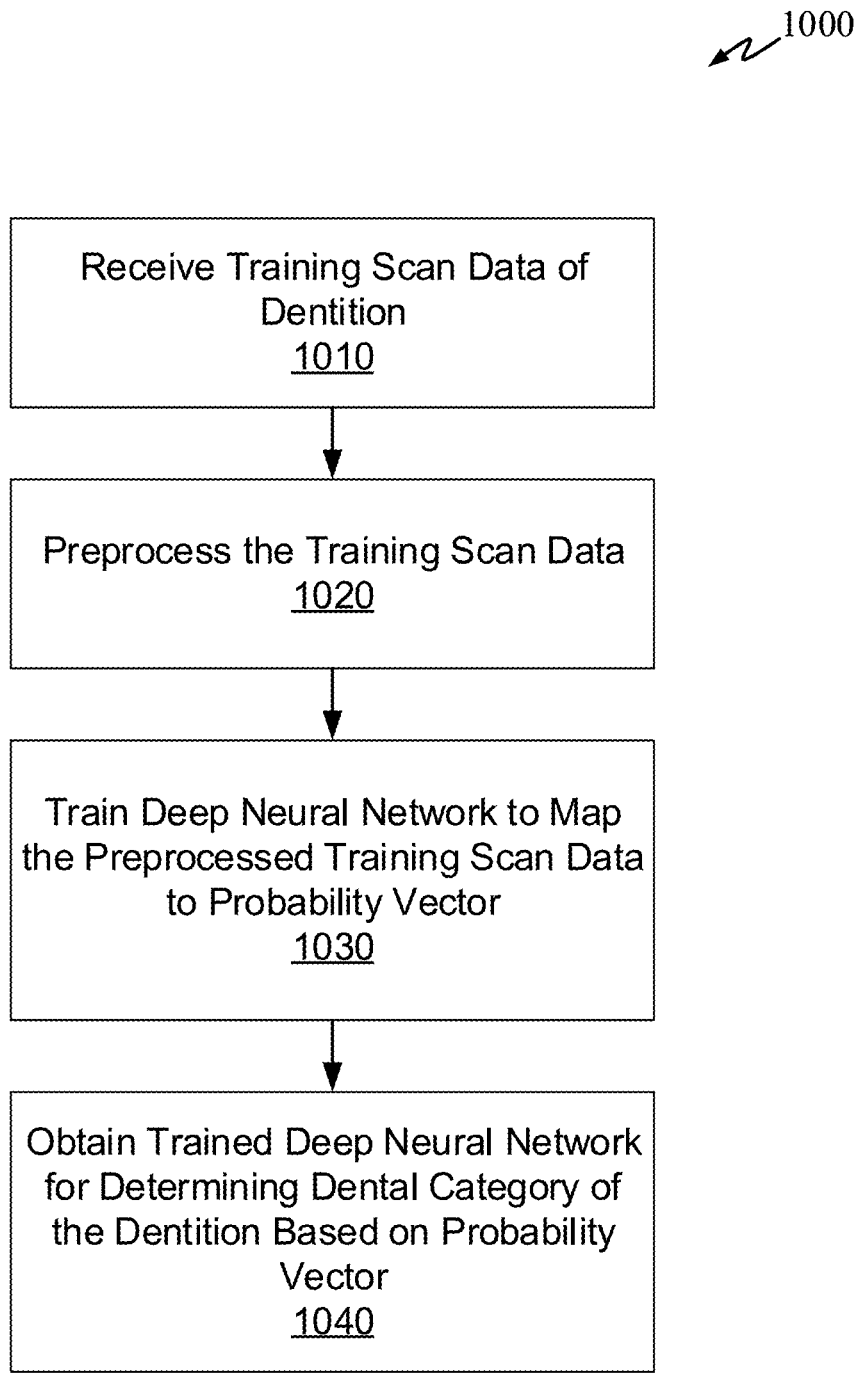
FIG. 10A-B are flow charts of methods for training a deep neural network according to some embodiments.

FIG. 10A is a flow chart of a method 1000 for training a deep neural network according to one embodiment. Method 1000 can be performed by training module 123 of the dental restoration server 101. The instructions, processes, and algorithms of method 1000 may be stored in memory 206 of computing device 200, which can act as dental restoration server 101. The algorithms and instructions of method 1000, when executed by processor 202, enable computing device 200 to train one or more deep neural networks for recognizing or identifying dental information or features in dental models or scanned data sets of a patient's dentition. However, some or all of the steps may be performed by other entities or modules. In addition, some embodiments may perform the steps in parallel, perform the steps in different orders, or perform different steps. Initially, training module 123 may receive (at 1010) one or more training data sets of a patient's dentition. For example, each training data set can be 3D dental models of portions of patients' dentitions. As described above, the 3D dental models can be received along with the clients' requests for dental restoration. Alternatively, the 3D dental models can be generated at the dental labs by scanning impression or physical model of the patients' teeth.

At 1020, training module 123 may preprocess the training data set to convert the 3D data into an appropriate format for use as inputs in various deep neural networks. For example, training module 123 may generate depth maps and/or spherical distance maps from the 3D scan data of dental models. Training module 123 may segment the 3D scan data of dental models into separate portions of dentitions, e.g., upper and lower jaws, prepared and opposing jaws, and create depth maps of the separate portions. For example, training module 123 may generate a depth map of a lower jaw, a depth map of an upper jaw and a depth map of the prepared tooth, as shown in FIGS. 4A-4C. As an additional example, training module 123 may generate a spherical distance map of a patient's dentition, as shown in FIG. 4D.

At 1030, training module 123 may train one or more deep neural networks to map the preprocessed training data sets to one or more probability vectors. The probability vector includes one or more probability values that indicate the probability of the dentition portion represented by each of the training data sets to contain one or more features belonging to a category of dental feature, tooth surface anatomy, or restoration type. Hereinafter, a category of dental features and anatomy, tooth surface anatomy, dental restoration types, jaw anatomy, and teeth dentition can be referred to collectively as a collection of dentition categories. Additionally, a tooth dentition may be an aspect or a feature a dentition category. For example, a tooth dentition can be a prepared tooth, a cusp of a tooth, an upper lateral incisor (tooth #7), etc.

Training module 123 may train the deep neural network to recognize one or more dentition categories are present or identified in the training data set based on the output probability vector. For example, assuming that the training data set contains a large number of depth maps representing patients' upper jaws and/or depth maps representing patients' lower jaws. Training module 123 can use the training data set to train a deep neural network to recognize an upper jaw and lower jaw from a new dental model. The deep neural network is trained to map the depth maps of upper jaws to a probability vector including probabilities of the depth maps belonging to an upper jaw and a lower jaw, where the probability of the depth maps belonging to an upper jaw is the highest in the vector, or substantially higher than the probability of the depth maps belonging to an lower jaw. Similarly, the deep neural network is trained to map the depth maps of lower jaws to a probability vector including probabilities of the depth maps belonging to an upper jaw and a lower jaw, where the probability of the depth maps belonging to a lower jaw is the highest in the vector, or substantially higher than the probability of the depth maps belonging to an upper jaw. Therefore, the deep neural network is trained so that if in future a new dental model is input into the deep neural network, the deep neural network can return a resulting probability vector indicating the category (e.g., upper jaw or lower jaw) of the new dental model, which corresponds to the highest probability in the vector.

Training module 123 therefore obtains (at 1040) the trained deep neural network for determining dental category of the dentition based on probability vector. For example, training module 123 can also train and/or obtain deep neural networks for recognizing prepared jaw and opposing jaws, identifying prepared tooth (e.g., determining the tooth number of the preparation), identifying tooth numbers of other teeth in the dental models, recognizing restoration types (e.g., crown, inlay, bridge, implant, etc.), detecting different types of features (e.g., cusps) and margin lines. In some embodiments, training module 123 can also train and/or obtain deep neural networks for locating the features and margin lines in the dental model. For example, the deep neural networks can be trained to detect where certain types of features are and where the margin lines are on the prepared teeth.

Figure 10B:
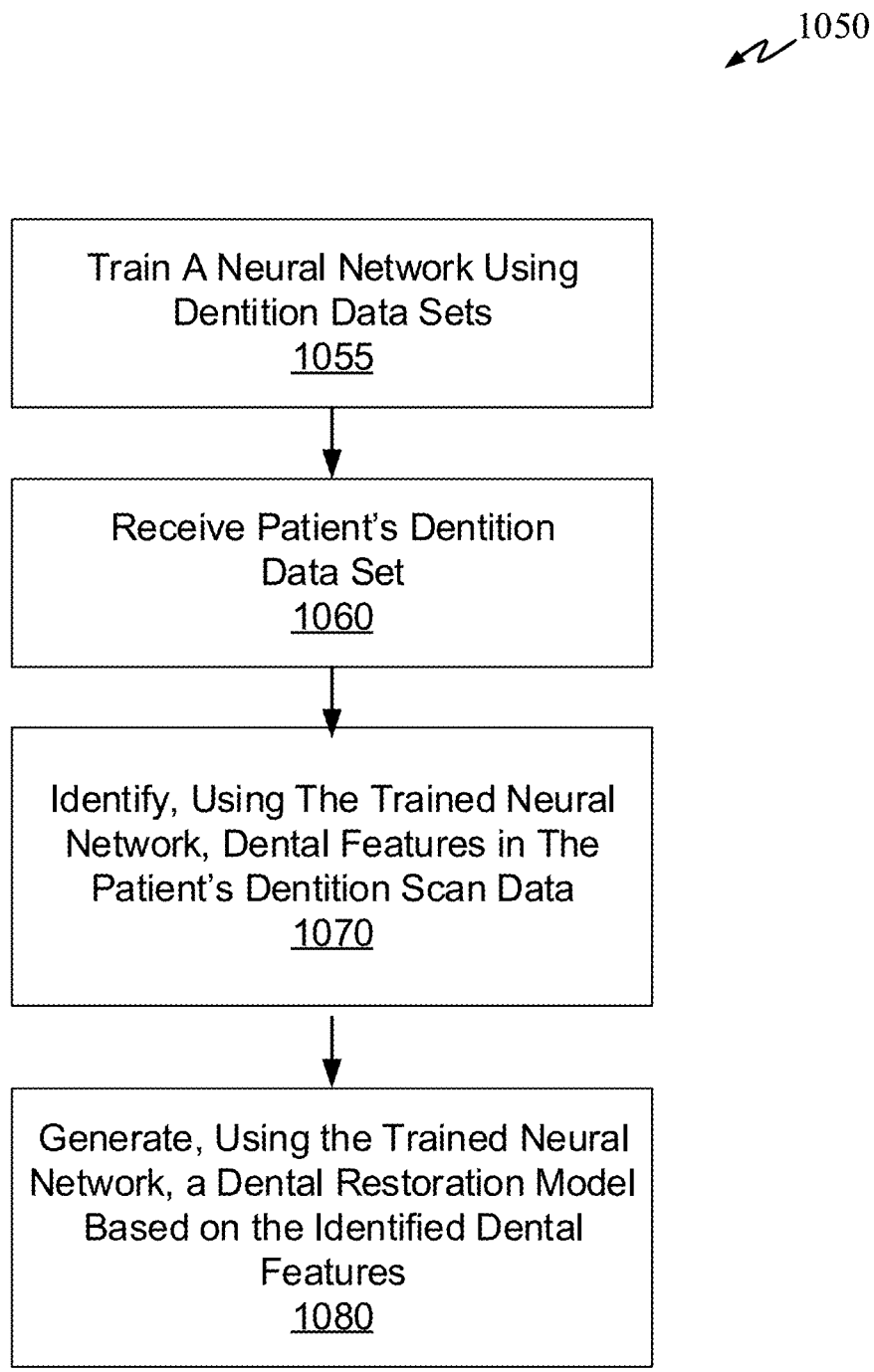

FIG. 10B is a flow chart of a method 1050 for training a deep neural network to generate a model of a dental restoration in accordance with some embodiments of the present disclosure. Method 1050 can be performed by one or more modules of dental restoration server 101 such as training module 123. The instructions, processes, and algorithms of method 1050 may be stored in memory 206 of computing device 200. The algorithms and instructions of method 1050, when executed by processor 202, enable computing device 200 to train (at 1055) one or more deep neural networks, using one or more dentition training data sets, to identify one or more dental features or dentition categories in the patient's scan data based on one or more output probability values of a probability vector. For example, if one of the probability values of the probability vector that corresponds to a dental feature such as a prepared tooth is high at 95% confidence, then the neural network identifies the prepared tooth as one of the features in the patient's dentition data set. As another example, if a probability value corresponding to a location of the prepared tooth is high, then the neural network identifies that corresponding location as the location of the prepared tooth.

Training module 123 can also train one or more deep neural networks to predict the shape and size of a missing tooth based on the unsupervised learning of hundreds or thousands of sample dentition data sets. By learning the attributes of various dental features in thousands of training data sets, the neural network can predict the shape and size of various dental restorations such as crowns or dental implants. In one embodiment, training module 123 can train deep neural networks to learn various dental features' attributes such as: the gap defined by a missing tooth; shape and size of the gap; the shape, size, and location of a prepared tooth; the shape, size, and location of a bone graft area; the shape, size, and location of one or more neighboring teeth, the margin line, the spatial relationship of cusps on each tooth and of cusps between neighboring teeth on the same jaw and the opposing jaw; and other surface tooth anatomy, etc. At 1070, training module 123 can train the deep neural network to identify and characterize various dental features present and/or missing from the training data sets by mapping each of those features to a highest probability value of a probability vector. Stated differently, each probability value indicates a probability that one or more dental features in at least a portion of a dentition training data set belonging to one or more of the tooth surface anatomy, the tooth dentition, and the restoration type.

In an example of identifying a prepared tooth, training module 123 may train the deep neural network to map depth map images of a prepared tooth to a probability vector that includes one or more high probability values—corresponding to a prepared tooth—to have a high value. Additionally, training module 123 trains the deep neural networks to map depth and map images of a prepared tooth to probability values corresponding to other dental features (not a prepared tooth) to have a very low value.

At 1060, a patient's dentition data set is received at client device 107 or at restoration server 101. As previously stated, the patient's dentition data set may be data derived from scanning a 3D impression or model of the patient's teeth or by intraorally scanning the patient's teeth. The patient scan/dentition data set may be collected by scanner 109 and stored on client device 107 at dental office of client 175. A patient's dentition data set can be data from multiple scans at various locations of the patient's mouth. Once a request for a neural network generated model is made, the patient's dentition data set can be sent to dental restoration server 101.

Once the deep neural network is trained, training module 123 can cause the deep neural network to generate (at 1080) a model of a crown, a bridge, or a dental implant to replace a prepared tooth, a gap, or a bone graft area in the patient's dentition data set by using the learned attributes of hundreds and thousands of dental features in the training data sets.

It should be noted that some or all of the processes and procedures described in method 1050 may be performed by other entities or modules within restoration server 101 or by another remote computing device. In addition, one or more blocks (processes) of method 1050 may be performed in parallel, in a different order, or even omitted.

Figure 11:
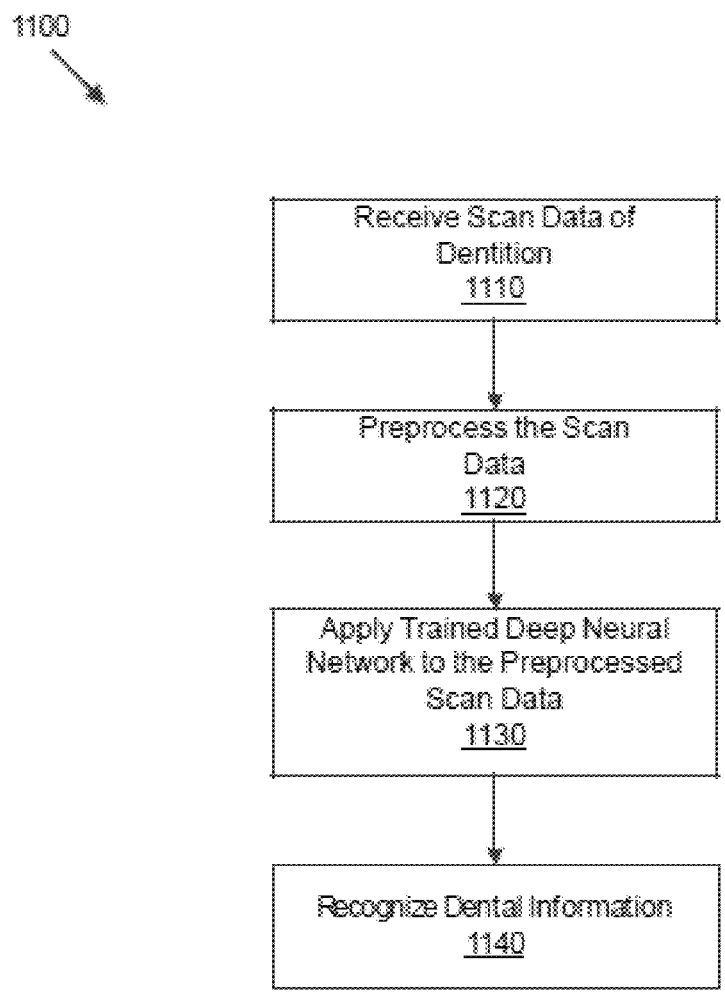
FIG. 11 is a flow chart of a method for recognizing dental information associated with a dental model using a trained deep neural network according to one embodiment.

FIG. 11 is a flow chart of a method 1100 for recognizing dental information from a dental model using a trained deep neural network according to one embodiment. Method 1100 can be performed by one or more modules of dental restoration server 101 such as scan recognition module 125. The instructions, processes, and algorithms of method 1100 may be stored in memory 206 of computing device 200, and when executed by processor 202, they enable computing device 200 to perform the training of one or more deep neural networks for recognizing dental information associated with dental models.

At 1110, scan recognition module 125 receives scan data of a dentition. For example, scan recognition module 125 can receive a 3D scan dental model attached with a client's restoration request. At 120, scan recognition module 125 can then preprocess the scan data to an appropriate format for use as inputs for the neural network. For example, scan recognition module 125 may preprocess the dental model similarly as the training module 123 preprocesses the training data set. Scan recognition module 125 may convert the 3D dental model into a 2D depth map representing a portion of the patient's dentition. For example, scan recognition module 125 may generate one or more depth maps representing different portions of the patient's dentition, e.g., different jaws.

At 1130, scan recognition module 125 may apply the trained one or more deep neural networks to the preprocessed scan data. For example, scan recognition module 125 applies the trained deep neural networks by using the one or more depth maps of the dental model as input. The pre-trained deep neural networks can return probability vectors indicating the categories of the depth maps. At 1140, scan recognition module 125 may recognize the dental information based on the output of the pre-trained deep neural networks. For example, scan recognition module 125 may recognize the upper and lower jaws based upon the highest probability values in the output probability vectors. Scan recognition module 125 can also recognize (identify, locate, and characterize) prepared jaws and opposing jaws, prepared tooth (e.g., the tooth number of the prepared tooth), tooth numbers of other teeth in the dental models, restoration types (e.g., crown, inlay, bridge, implant, etc.), feature types (e.g., cusps) and margin lines. In some embodiments, scan recognition module 125 can also locate the features and margin lines in the dental model. For example, scan recognition module 125 can detect where a certain type of features is and where the margin lines are on the prepared teeth based upon the pre-trained deep neural networks.

Qualitative evaluation of dental restoration designs using deep neural networks is another example of methods described herein. An appropriately trained automatic qualitative evaluation system using deep neural networks provides a mechanism for obtaining a qualitative assessment of a restoration design using less time and providing more consistency than a conventional manual qualitative assessment system.

Some or all of the processes and procedures described in method 1100 may be performed by one or more other entities or modules within restoration server 101 or within another remote computing device. In addition, one or more blocks (processes) of method 1100 may be performed in parallel, in a different order, or even omitted.

FIG. 15 is a flow chart of a method 1500 for training a deep neural network according to another embodiment. Method 1500 can be performed by one or more modules of dental restoration server 101 such as training module 123. The instructions, processes, and algorithms of method 1500 may be stored in memory 206 of computing device 200, and when executed by processor 202, they enable computing device 200 to perform the training of one or more deep neural networks for performing qualitative evaluations of dental restoration designs. Some or all of the processes and procedures described in method 1500 may be performed by one or more other entities or modules within restoration server 101 or within another remote computing device. In addition, one or more blocks (processes) of method 1100 may be performed in parallel, in a different order, or even omitted.

Initially at 1510, training module 123 may receive a training data set of a dentition and of restoration designs. In order to train the deep neural network, the training data set of dentition and of restoration designs are labeled as either accept or reject. At 1520, training module 123 may preprocess the training data set and the restoration design data. For example, training module 123 may generate depth maps and/or spherical distance maps from the 3D dental models. Training module 123 may segment the 3D dental models into separate portions of dentitions, e.g., upper and lower jaws, prepared and opposing jaws, and create depth maps of the separate portions. For example, training module 123 may generate a depth map of a lower jaw, a depth map of an upper jaw and a depth map of the prepared tooth, as shown in FIGS. 4A-4C. As an additional example, training module 123 may generate a spherical distance map of a patient's dentition, as shown in FIG. 4D.

At 1530, by using the accept or reject label associated with each instance of training data set and training restoration designs, training module 123 may train one or more deep neural networks to perform a qualitative evaluation of one or more aspects (e.g., margin line fit, contact surfaces with adjacent teeth, occlusion with the teeth of the opposing jaw, contour of the crown) of the restoration design. The qualitative evaluation includes identification of the presence of certain types or classifications of defects in the restoration design. Training module 123 may train the deep neural network so that the output of the deep neural network indicates an assessment or result of the qualitative evaluation. For example, assuming that the training data set is a large number of depth maps and spherical distance maps representing patients' upper and lower jaws including a prepared tooth in the lower jaw and a large number of depth maps (occlusal/buccal/lingual) of restoration designs, training module 123 may use the training data set and training restoration design data to train a deep neural network to detect different types of design defects in the restoration design. Therefore, the deep neural network is trained so that if in the future a new dental model and restoration design are input into the deep neural network, the deep neural network can return a resulting qualitative assessment of the restoration design indicating the presence, absence, number of incidences, or other measure of any design defects in the restoration design.

At 1540, training module 123 therefore may obtain the trained deep neural network for performing a qualitative evaluation of the contour of a restoration design. In other embodiments, training module 123 may also train and obtain deep neural networks for performing qualitative evaluations of additional aspects of the restoration design, such as the margin line fit, contact surfaces with adjacent teeth, and occlusion with the teeth of the opposing jaw.

FIG. 16 is a flow chart of a method 1600 for performing a qualitative evaluation of a restoration design using a trained deep neural network according to one embodiment. Method 1600 can be performed by one or more modules of dental restoration server 101 such as qualitative evaluation module 135 (see FIG. 1). The instructions, processes, and algorithms of method 1600 may be stored in memory 206 of computing device 200, and when executed by processor 202, they enable computing device 200 to perform the training of one or more deep neural networks for performing qualitative evaluations of dental restoration designs. Some or all of the processes and procedures described in method 1500 may be performed by one or more other entities or modules within restoration server 101 or within another remote computing device. In addition, one or more blocks (processes) of method 1100 may be performed in parallel, in a different order, or even omitted.

At 1610, scan recognition module 125 may receive scan data of a dentition. For example, scan recognition module 125 receives a 3D scan dental model attached with a client's restoration request. At 1610, design device 103 may also receive the restoration design data. For example, design device 103 recognizes the dental information associated with the scan data of the dentition and generates and receives a proposed restoration design. At 1620, scan recognition module 125 may preprocess the scan data. For example, scan recognition module 125 may preprocess the dental model similarly as the training module 123 preprocesses the training data set. Scan recognition module 125 may convert the 3D dental model into a 2D depth map and/or spherical distance map representing a portion of the patient's dentition. For example, the scan recognition module 125 may generate one or more depth maps representing different portions of the patient's dentition, e.g., different jaws, a prepared tooth, or the like. Scan recognition module 125 may also generate one or more spherical distance maps of a prepared tooth. Scan recognition module 125 may then provide the preprocessed scan data to the qualitative evaluation module. Similarly, design device 103 may provide the preprocessed dental restoration data to the qualitative evaluation module.

At 1630, qualitative evaluation module may apply the trained one or more deep neural networks to the preprocessed scan data and the restoration design data. For example, the qualitative evaluation module applies the trained deep neural networks by using the one or more depth maps and/or spherical distance maps of the dental model and the restoration design data as input. The pre-trained deep neural networks may perform qualitative evaluations indicating the presence of one or more types of defects in the restoration design.

At 1630, qualitative evaluation module may provide a final qualitative evaluation grade based on the output of the pre-trained deep neural networks. For example, in one embodiment, qualitative evaluation module 1630 may provide an output that has one of three levels: accept, minor adjustment, or complete remake. In an embodiment, the system may provide feedback to design device 103 based upon qualitative evaluation module 135 output that certain areas require improvement. Based upon this feedback, the restoration design will be improved by design device 103 and checked again until the qualitative evaluation module indicates that the restoration design is acceptable, or until a maximum number of iterations has been reached.

Figure 17:
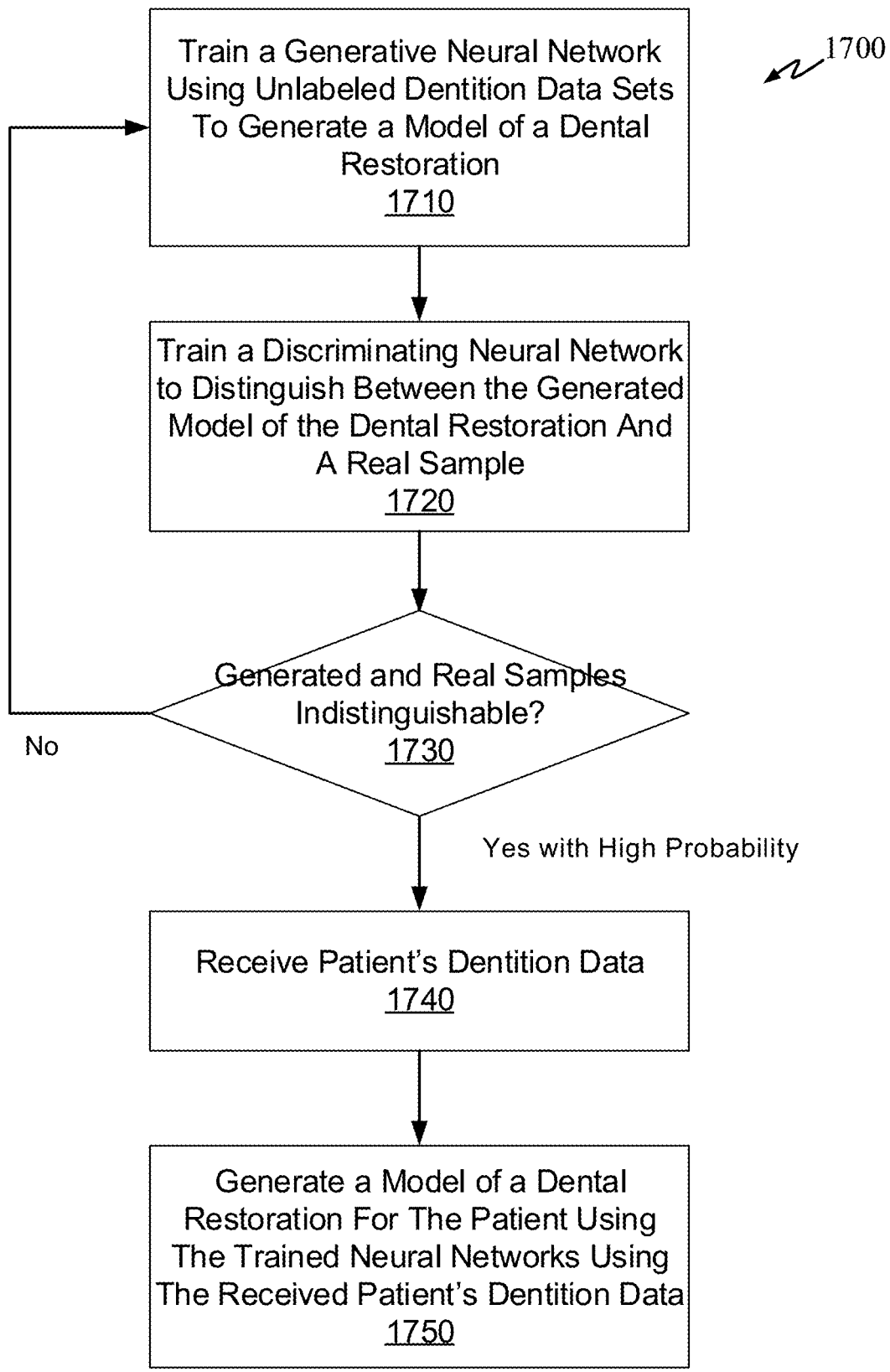
FIG. 17 is a flow chart of a method for training a deep neural network according to one embodiment.

FIG. 17 is a flow chart of a method 1700 for generating a model of a dental restoration in accordance with some embodiments of the present disclosure. Method 1700 can be performed by one or more modules of dental restoration server 101 such as training module 123. The instructions, processes, and algorithms of method 1700 may be stored in memory 206 of computing device 200, and when executed by processor 202, they enable computing device 200 to perform the training of one or more deep neural networks for performing qualitative evaluations of dental restoration designs. Some or all of the processes and procedures described in method 1700 may be performed by one or more other entities or modules within restoration server 101 or within another remote computing device. In addition, one or more blocks (processes) of method 1700 may be performed in parallel, in a different order, or even omitted.

At 1710, training module 123 may train a generative deep neural network (generator 510) using unlabeled dentition data sets to generate a model of a dental restoration such as a crown. In one embodiment, labeled and categorized dentition data sets may be used, but not necessary. The generative deep neural network may reside in training module 123 or in a separate and independent neural network module of server 101.

At 1720, and at substantially the same, training module 123 may also train a discriminating deep neural network (discriminator 520) to recognize that the dental restoration generated by the generative deep neural network is a model versus a digital model of a real dental restoration. In the recognition process, the discriminating deep neural network can generate a loss function based on comparison of a real dental restoration and the generated model of the dental restoration. The loss function provides a feedback mechanism for the generative deep neural network. Using information from the outputted loss function, the generative deep neural network may generate a better model that can better trick the discriminating neural network to think the generated model is a real model.

The generative deep neural network and the discriminating neural network can be considered to be adverse to each other. In other words, the goal of the generative deep neural network is to generate a model that cannot be distinguished by the discriminating deep neural network to be a model belonging to a real sample distribution or a fake sample distribution (a generated model). At 1730, if the generated model has a probability value indicating that it is most likely a fake, the training of both deep neural networks repeats and continues again at 1710 and 1720. This process continues and repeats until the discriminating deep neural network cannot distinguish between the generated model and a real model. In other words, the probability that the generated model is a fake is very low or that the probability that the generated model belongs to a distribution of real samples is very high.

Once the deep neural networks are trained, method 1700 is ready to generate a model of a dental restoration based on the patient's dentition data set, which is received at 1740. At 1750, a model of the patient's dentition data set is generated using the received patient's dentition data set.

Figure 18:
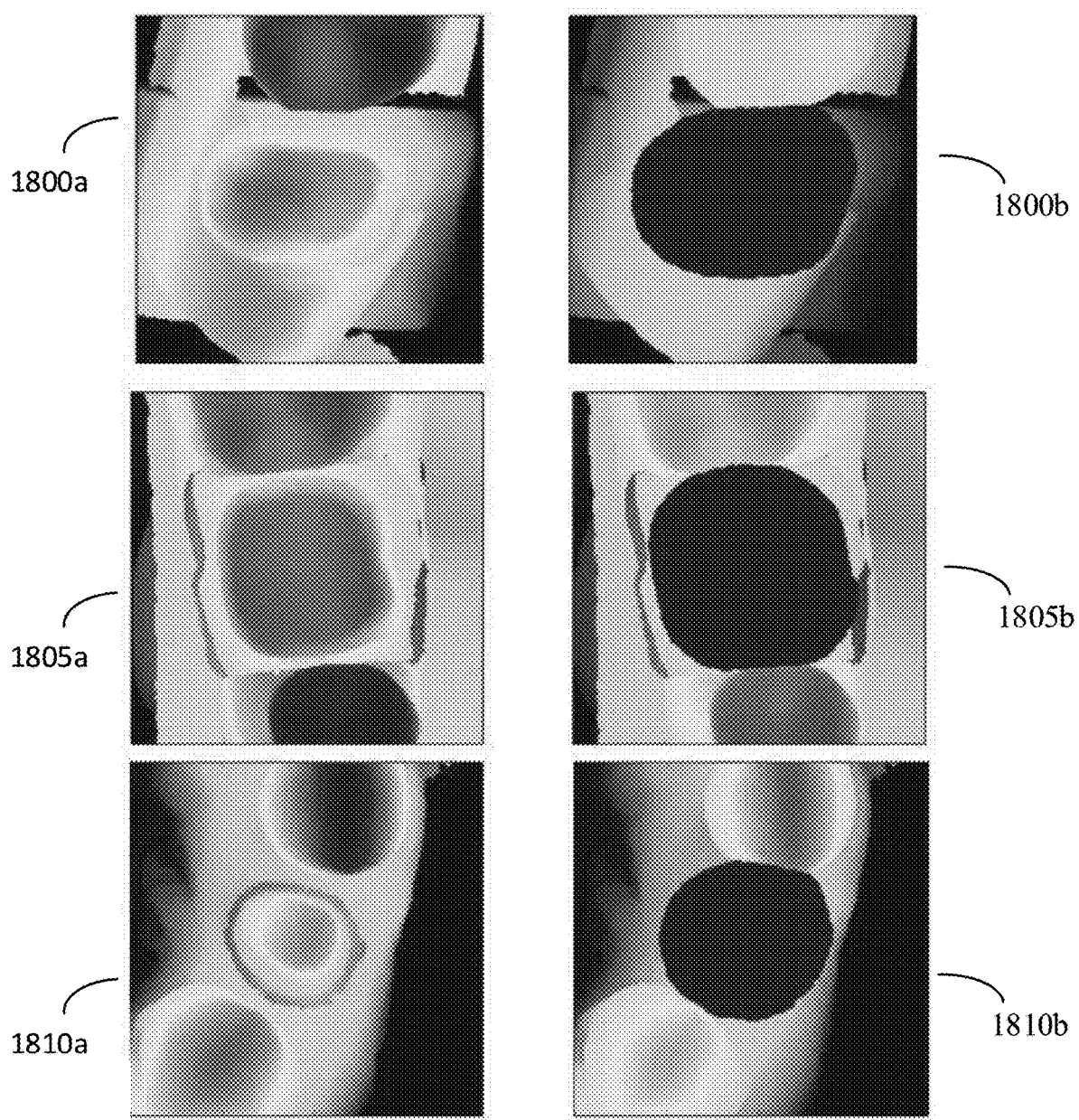
FIG. 18 is a graphic representation of an example input data set and corresponding outputs generated by neural networks according to one embodiment.

FIG. 18 illustrates examples of inputs and corresponding outputs of dental restorations generated by one of the methods 1050 and 1700. In method 1700, depth maps 1800*a*, 1805*a*, and 1810*a* of prepared tooth are provided as inputs to the trained generative deep neural network (e.g., generator 510). In response to the input depth maps, the trained generative deep neural network may generate images 1800*b*, 1805*b*, and 1810*b* that are generated by the trained generative deep neural network (generator 510) based on the input depth maps. Images 1800*b*, 1805*b*, and 1810*b* are the corresponding depth maps having a contour of a crown for input images 1800*a*, 1805*a*, and 1810*a*, respectively.

In one embodiment, to pre-train the generative deep neural network (generator 510), specifically designed dentition training data sets can be used. In the illustrated example of FIG. 18, to pre-train the generative deep neural network identifies and characterizes a prepared tooth and to generate a crown contour, the training data sets can include numerous real-life examples of before and after pair images. In this instance, the before and after images are images of the prepared tooth and the crown installed on the prepared tooth. The training data set can include hundreds or thousands of prepared tooth and crown images and/or their depth maps. A non-adversarial or non-generative deep neural network as illustrated in FIG. 5A can also be trained using similar training data sets.

In one embodiment, to train a deep neural network to recognize and learn various attributes (e.g., shape, size) of a dental feature such as tooth #3, the training data set may include thousands of real images—from real dental patients—of tooth #3. Similarly, to train a deep neural network to recognize and learn various attributes (e.g., shape, size) of a dental feature such a dental implant, the training data set may include thousands of images of real dental implants.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats.

Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming.

Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A computer-implemented method for recognizing dental information using deep neural networks (DNNs), the method comprising:
   training, by one or more computing devices using a plurality of dentition training data sets, a deep neural network to map one or more dental features in at least one portion of each dentition training data set from the plurality of dentition training data sets to one or more highest probability values of a probability vector;
   receiving, by the one or more computing devices, a patient's scan data representing at least one portion of the patient's dentition data set;
   identifying, using the trained deep neural network, one or more dental features in the patient's scan data based on one or more output probability values of the deep neural network;
   determining locations of the identified one or more dental features including the locations of a prepared tooth; and
   generating, using a trained generative deep neural network, a contour of a crown for the prepared tooth based on the identified one or more dental features and the locations of the identified one or more dental features in the patient's scan data, wherein the crown is to be attached to the prepared tooth.

2. The method of claim 1, wherein training the deep neural network further comprises mapping locations of the one or more dental features in the at least one portion of each dentition training data set to a highest location probability value of a location probability vector; and
   wherein determining locations of the identified one or more dental features in the patient's scan data is based on output probability values.

3. The method of claim 1, further comprises comparing, using a discriminating deep neural network, the generated contour of the crown for the prepared tooth in the patient's scan data with an image of a real crown contour from a real-sample data sets to output a loss function based on the comparison, and wherein the deep neural network is configured to generate a second contour of the crown based on the output loss function of the second discriminating deep neural network.

4. The method of claim 1, wherein one or more dental features in the at least one portion of each dentition training data set comprise one or more of a tooth surface anatomy, a tooth dentition, and a restoration type.

5. The method of claim 2, wherein the probability vector comprises a plurality of probability values, wherein each probability value indicating a probability that the one or more dental features in at least one portion of each dentition training data set belonging to one or more of a tooth surface anatomy, a tooth dentition, and a restoration type.

6. The method of claim 3, further comprises segmenting each of the training data sets into different portions, wherein each portion represents a characteristic of a tooth surface anatomy, a tooth dentition, or a restoration type.

7. The method of claim 3, further comprises segmenting the patient's scan data into different portions prior to identifying the one or more dental features in the patient's scan data, wherein each different portion represents an aspect of a tooth surface anatomy, a tooth dentition, or a restoration type.

8. The method of claim 4, wherein the tooth surface anatomy comprises one or more features selected from a group of buccal and lingual cusps, distobucall and mesiobuccal inclines, distal and mesial cusp ridges, distolingual and mesiolingual inclines, occlusal surface, and buccal and lingual arcs.

9. The method of claim 4, wherein the tooth dentition comprises one or more classifications selected from a group consisting of upper and lower jaws, prepared and opposing jaws, prepared tooth, and tooth numbers.

10. The method of claim 4, wherein the restoration type comprises one or more restoration selected from a group consisting of crown, inlay, bridge, and implant.

11. The method of claim 1, further comprises:
    preprocessing the plurality of dentition training data sets by generating a depth map for each training data set, wherein each training data set comprises three dimensional (3D) data.

12. The method of claim 11, wherein the preprocessing of the plurality of dentition training data sets is conducted prior to the training of the deep neural network.

13. The method of claim 11, wherein the depth map is generated by converting 3D coordinates of each point of the 3D data into a distance value from a given plane to each point.

14. A computer program product comprising a computer-readable storage medium having computer program logic recorded thereon for enabling a processor-based system to recognize dental information and to design a dental restoration from the recognized dental information, the computer program product comprising:
    a first program logic module for enabling the processor-based system to train a first deep neural network to map one or more dental features in at least one portion of each dentition training data set from a plurality of dentition training data sets to one or more highest probability values of a probability vector;
    a second program logic module for enabling the processor-based system to receive a patient's scan data representing at least one portion of the patient's dentition data set; and
    a third program logic module for enabling the processor-based system to use the first deep neural network to identify one or more dental features in the patient's scan data based on one or more output probability values of the deep neural network,
    wherein the third program logic module comprises:
    logic for enabling the processor-based system to determine the locations of a prepared tooth; and logic for enabling the processor-based system to generate, using a trained generative deep neural network, a contour of a crown for the prepared tooth based on the identified one or more dental features in the patient's scan data, wherein the crown is to be attached to the prepared tooth.

15. The computer program product of claim 14, further comprises a fourth program logic module for enabling the processor-based system to train a second deep neural network to output a loss function based on a comparison of the generated contour of the crown for the prepared tooth in the patient's scan data with an image of a real crown contour from a real-sample data sets, and wherein the first neural network is configured to generate a second contour of the crown based on the output loss function of the second deep neural network.

16. The computer program product of claim 14, wherein the one or more dental features in the at least one portion of each dentition training data set comprise one or more of a tooth surface anatomy, a tooth dentition, and a restoration type.

17. The computer program product of claim 14, wherein the first program logic module further comprises:

logic for enabling the processor-based system to preprocess the plurality of dentition training data sets by generating a depth map for each training data set prior to training the deep neural network, wherein each training data set comprises three dimensional (3D) data, wherein the depth map is generated by converting 3D coordinates of each point of the 3D data into a distance value from a given plane to each point.

18. A system for fabricating a dental restoration from a patient's dentition data, the system comprising:

a dental restoration client, wherein the dental restoration client receives, from a user interface, an input indicating a selection of a dental restoration type to be fabricated;

a 3D modeling module, wherein the 3D modeling module:

receives a dentition data set of a patient, wherein the patient's dentition data set is generated by scanning a 3D impression or model of the patient's teeth;

selects a deep neural network pre-trained by a group of training data sets designed to model a specific restoration type that matches the selected dental restoration type;

uses the patient's dentition data set as an input to the selected pre-trained deep neural network; and generates, using a trained generative deep neural network, an output restoration model using the selected pre-trained deep neural network based on the patient's dentition data, wherein the restoration model is to be used on a preparation site; and a 3D model fabricator, wherein the 3D model fabricator fabricates a 3D model of the selected dental restoration type using the output restoration model generated by the 3D modeling module.

* * * * *